United States Patent [19]

Patterson et al.

[11] Patent Number: 5,408,237
[45] Date of Patent: Apr. 18, 1995

[54] EARTH-FIXED CELL BEAM MANAGEMENT FOR SATELLITE COMMUNICATION SYSTEM

[75] Inventors: David P. Patterson, Los Altos; Mark A. Sturza, Woodland Hills, both of Calif.

[73] Assignee: Teledesic Corporation, Kirkland, Wash.

[21] Appl. No.: 88,714

[22] Filed: Jul. 8, 1993

Related U.S. Application Data

[63] Continuation-in-part of Ser. No. 790,318, Nov. 8, 1991, abandoned.

[51] Int. Cl.⁶ .................. H04B 7/185; G01S 5/02; H04M 11/00
[52] U.S. Cl. .................. 342/354; 342/357; 455/12.1; 455/13.3; 379/58
[58] Field of Search .................. 342/354, 357, 368; 455/12.1, 13.3; 379/58

[56] References Cited

U.S. PATENT DOCUMENTS

| | | | |
|---|---|---|---|
| 3,541,553 | 11/1970 | Gubin | 342/352 |
| 4,931,802 | 6/1990 | Assal et al. | 342/356 |
| 5,017,925 | 5/1991 | Bertiger et al. | 342/352 |
| 5,038,147 | 8/1991 | Cerro et al. | 342/368 |
| 5,073,900 | 12/1991 | Mallinckrodt | 375/1 |
| 5,115,248 | 5/1992 | Roederer | 342/373 |
| 5,303,286 | 4/1994 | Wiedeman | 379/59 |

OTHER PUBLICATIONS

"Advanced Communications Technology Satellite (ACTS) . . . " L. Wright et al., Proceedings of the IEEE, vol. 78, No. 7, Jul. 1990, pp. 1165–1175.

"A Multibeam Active Antenna for an European Contiguous Coverage at Ku-band," G. Bartolucci et al., Globecom 1989, vol. 3, pp. 1115–1119.

"A Metropolitan Area Radio System Using Scanning Pencil Beams," A. Acampora et al., IEEE Transactions on Communiciations, Jan. 1991, pp. 141–151.

*Primary Examiner*—Gregory C. Issing
*Attorney, Agent, or Firm*—Anglin & Giaccherini

[57] ABSTRACT

Earth-fixed cell beam management methods which may be employed to allocate beams generated by a constellation of low Earth orbit satellites (12) flying in orbits below geosynchronous altitudes are disclosed. These beams (19) are electronically steered so that they illuminate "Earth-fixed cells" (26) as opposed to "satellite-fixed cells." In a system that employs satellite-fixed cells, the "footprint" of the beams propagated by a spacecraft defines the zone on the ground called a "cell" which is illuminated by the spacecraft. This satellite-fixed cell moves constantly as the spacecraft moves around the globe. In sharp contrast, an "Earth-fixed cell" (26) is a stationary region mapped onto the surface of the Earth (E) that has permanent fixed boundaries, just like a city or a state. Although the rapidly moving satellites (12) still shine their beams over the ground in rapidly moving footprints (16), the locations of the footprints at any given time do not determine the location of the unchanging Earth-fixed cells (26). The great advantage provided by using cells having boundaries that are fixed to an Earth-fixed grid (20) is realized when a subscriber being served by one satellite must switch to another beam in the same satellite or to a second satellite because the first is moving out of range below the local horizon. With satellite-fixed cells, this "hand-off" involves the assignment to the terminal of a new communication channel within the new beam or new satellite. This assignment process takes time and consumes processing capacity at both the terminal and the satellite. It is also subject to blocking, call interruption, and call dropping if there is not an idle communication channel in the next serving beam or satellite. The Earth-fixed cell method avoids these problems by allocating communication channels (frequency, code, and/or time slot) on an Earth-fixed cell basis rather than on a satellite-fixed cell basis. Regardless of which satellite/beam is currently serving a particular cell, the terminal maintains the same channel assignment, thus ameliorating the "hand-off" problem.

2 Claims, 17 Drawing Sheets

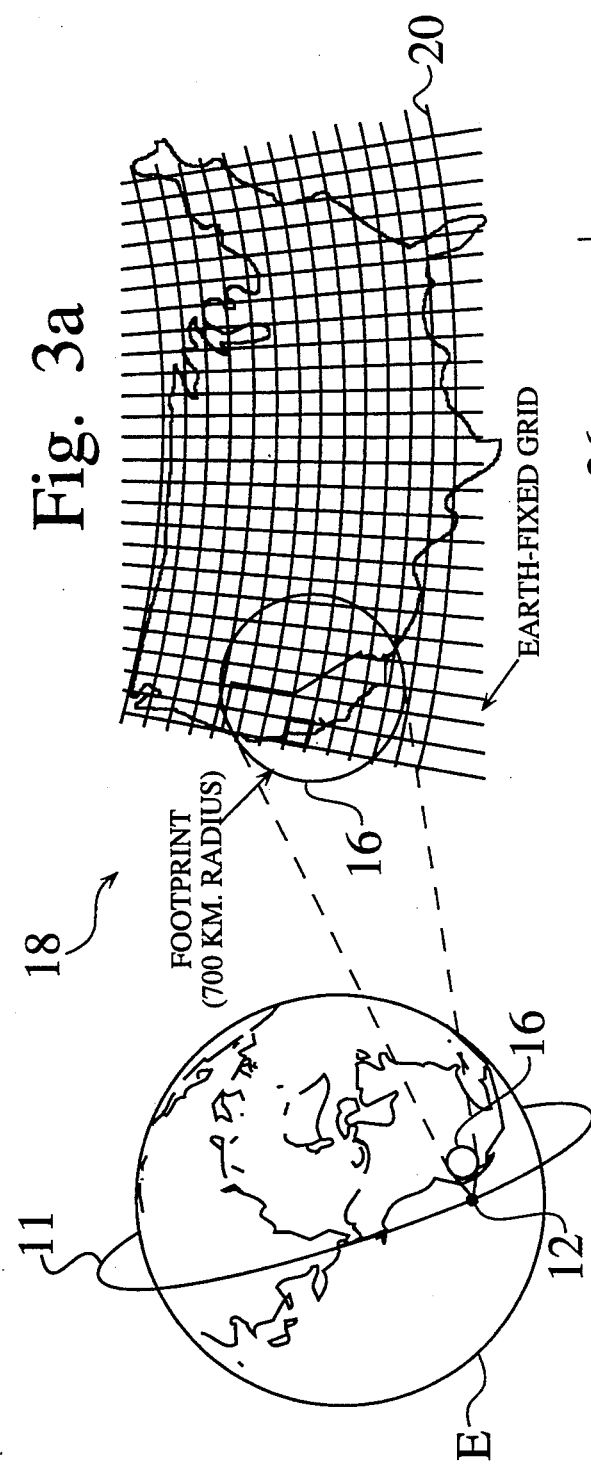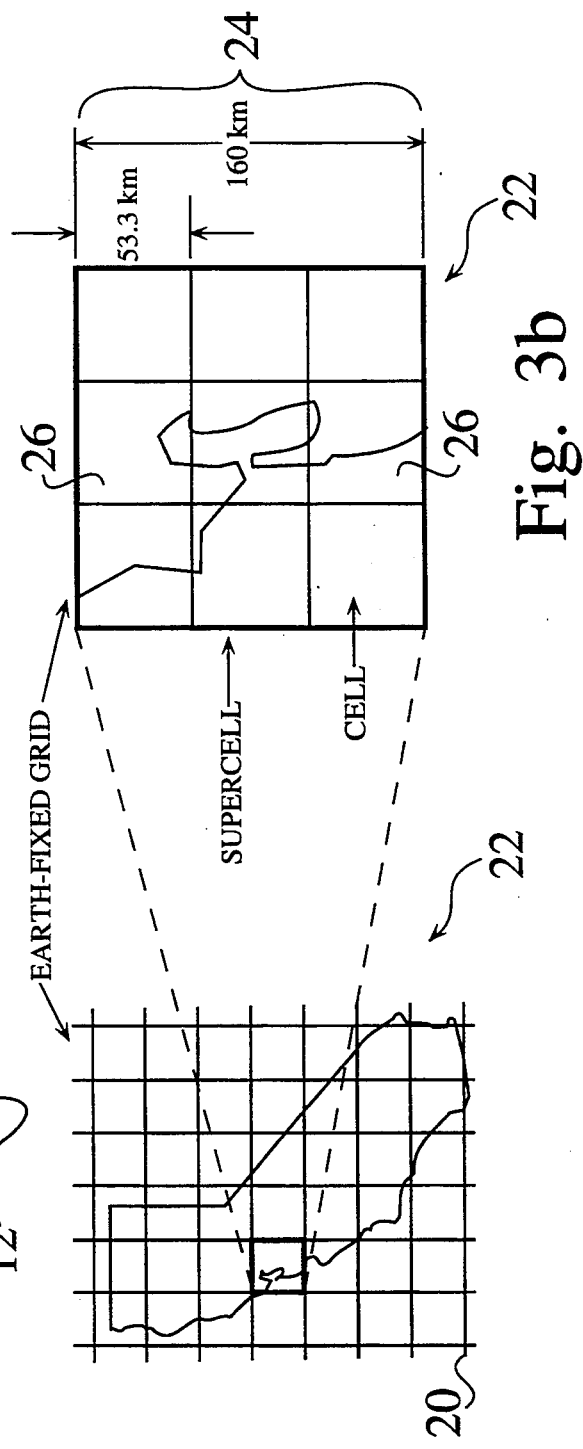

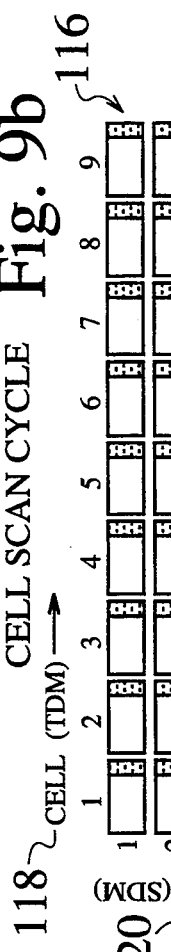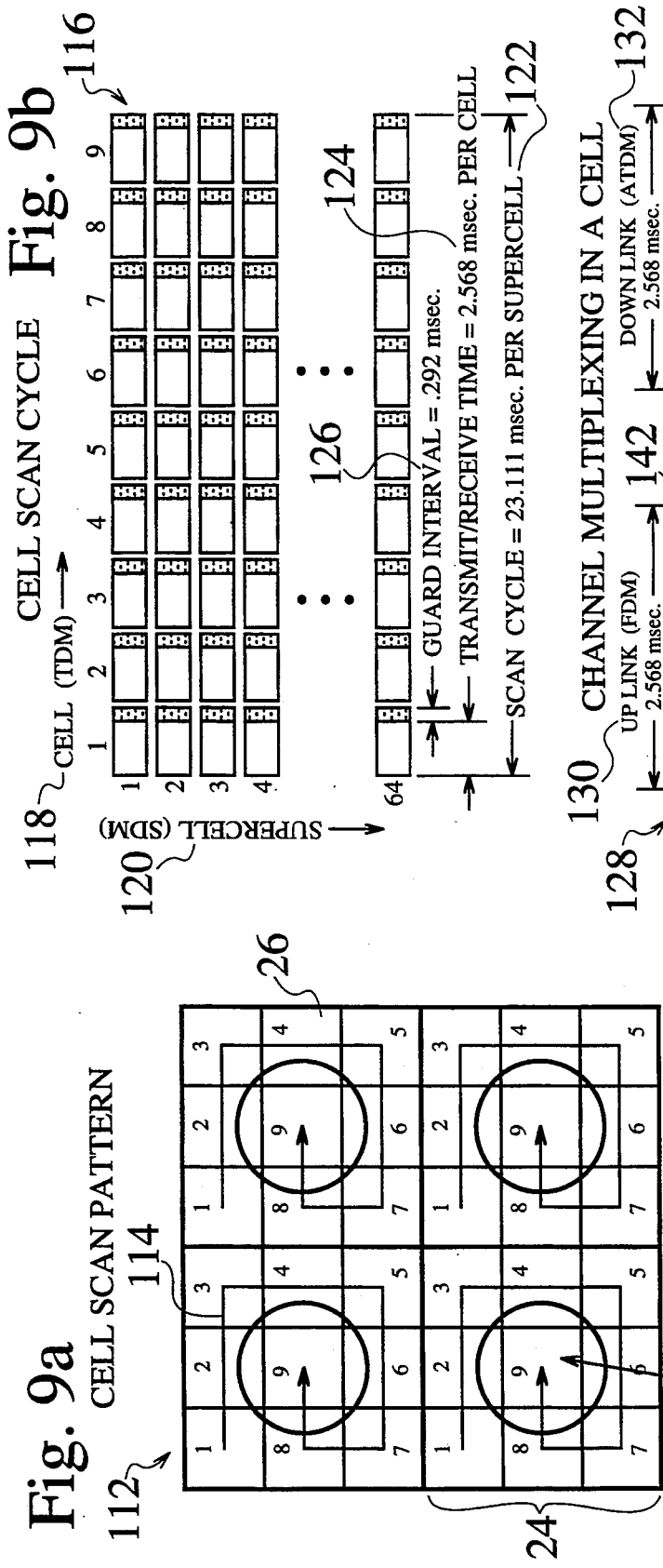

EARTH-FIXED CELL BEAM MANAGEMENT FOR SATELLITE COMMUNICATION SYSTEM

CROSS-REFERENCES TO RELATED PATENT APPLICATIONS

The present patent application is related to the following commonly-owned and commonly-assigned patent applications:

*Satellite Communication System* by Edward F. Tuck et al., filed on Oct. 28, 1991 and assigned U.S. Ser. No. 07/783,754;

*Terrestrial Antennas for Satellite Communication System* by Asu Ram Jha, a Continuation-in-Part application filed on Dec. 2, 1992 and assigned U.S. Ser. No. 07/984,609 and claiming the benefit of priority of a parent application entitled *Terrestrial Antennas for Satellite Communication System* by Asu Ram Jha, filed Nov. 8, 1991 and assigned U.S. Ser. No. 07/790,273;

*Switching Methods for Satellite Communication System* by David Palmer Patterson & Moshe Lerner Liron, filed on Nov. 8, 1991 and assigned U.S. Ser. No. 07/790,805;

*Spacecraft Antennas & Beam Steering Methods for Satellite Communication System* by Douglas Gene Lockie, filed on Oct. 28, 1992 and assigned U.S. Ser. No. 07/967,988 and claiming the benefit of priority of a parent application entitled *Spacecraft Antennas & Beam Steering Methods for Satellite Communication System* by Douglas Gene Lockie, filed on Nov. 8, 1991 and assigned U.S. Ser. No. 07/790,271;

*Spacecraft Designs for Satellite Communication System* by James R. Smart and David P. Patterson, filed on Aug. 18, 1992 and assigned U.S. Ser. No. 07/931,625 and claiming the benefit of priority of a parent application entitled *Spacecraft Designs for Satellite Communication System* by James R. Smart filed on Nov. 8, 1991 and assigned U.S. Ser. No. 07/790,748;

*Spacecraft Intersatellite Link for Satellite Communication System* by Douglas G. Lockie et al., filed on Jul. 16, 1992 and assigned U.S. Ser. No. 07/915,172;

*Method of Conducting a Telecommunications Business Implemented on a Computer* by Edward F. Tuck, filed on Jun. 8, 1992 and assigned U.S. Ser. No. 07/895,295;

*Traffic Routing for Satellite Communication System* by Moshe Lerner Liron, filed on Feb. 9, 1993 and assigned U.S. Ser. No. 08/016,204; and

*Modular Communication Satellite* by James R. Smart, filed on Jun. 11, 1993 and assigned U.S. Ser. No. 08/075,425.

CLAIM FOR PRIORITY

The present application is a Continuation in Part application. The inventors hereby claim the benefit of priority under Section 120 of Title 35 of the United States Code of Laws for any and all subject matter which is commonly disclosed in the present application and in pending patent application U.S. Ser. No. 07/790,318, now abandoned, entitled *Beam Compensation Methods for Satellite Communication System* by David P. Patterson et al., filed on Nov. 8, 1991.

FIELD OF THE INVENTION

The present invention relates to the field of satellite communications. More particularly, this invention provides apparatus and methods of directing radio beams to and from a constellation of satellites orbiting below a geosynchronous altitude to fixed regions on the ground called "Earth-fixed cells." This beam management system offers enhanced frequency coordination and communication reliability. The present invention substantially eliminates the problems encountered by previous satellite communication systems which utilize "satellite-fixed cells" that sweep across the surface of the Earth without the benefit of using an Earth-fixed grid.

BACKGROUND OF THE INVENTION

Public telephone networks currently utilize a combination of land lines, microwave repeaters, undersea cables and satellites operating in geosynchronous orbits. In the past decade, phone service has been enhanced by cellular systems. In response to burgeoning global demand for telephone service, communications utilities continue to seek the most effective means of offering more capacity at the lowest cost. The cost of supplying additional capacity by adding more terrestrial facilities is quite high. As an alternative, greater levels of communications services can be achieved employing large satellites that operate in geosynchronous orbit. This approach is also very expensive, and is unsuitable for providing direct service to phone customers using portable and mobile terminals because of the extremely high power levels that would be required to communicate with satellites flying at an altitude of 22,300 miles. In an effort to overcome the limitations of geosynchronous systems, several companies have recently proposed various networks of low Earth orbit satellites. These networks, however, would introduce their own set of formidable problems, because of the rapid motion of satellites over the regions on the Earth that they are designed to serve.

Several publications noted below disclose various systems that pertain to communication systems that are designed to operate on the Earth's surface or in conjunction with satellites flying in geosynchronous and low Earth orbits.

In U.S. Pat. No. 4,931,802, Assal et al. disclose a satellite which is designed exclusively for operation in a geosynchronous orbit. Assal et al. describe a multi-beam communication satellite, which the inventors say exploits the advantages of using a large number of small pencil beams to reduce satellite and terminal power requirements and to increase frequency reuse. The specification of this reference describes various implementations of a satellite-switched time division multiple access (TDMA) scheme. Assal et al. clearly intended to use their invention only with satellites whose positions remain fixed with respect to the Earth. They did not anticipate low Earth orbit satellites which do not fly in geostationary orbits, and did not address the problems faced by a low Earth orbit communication system which operates far below geostationary altitudes. Nothing in the Assal et al. specification describes a beam steering scheme that might be used to compensate for the rapid motion of the satellite with respect to Earth, changes in satellite attitude, or the Earth's rotation. Nor does the specification mention a means for handling the "hand-off" of a terminal from one satellite beam to another beam or to another satellite which would be required in a low Earth orbit system.

In U.S. Pat. No. 5,107,925, Bertiger et al. disclose a multiple beam space antenna system for facilitating communications between a satellite switch and a plurality of Earth-based stations.

Antoine Roederer describes a feed device for multibeam antennas in U.S. Pat. No. 5,115,248.

Samuel Gubin discloses a communication system employing a satellite capable of providing full communication coverage of an irregularly shaped area on the surface of the Earth in his U.S. Pat. No. 3,541,553.

Bertiger, Leopold and Peterson describe a *"Satellite Cellular Telephone and Data Communication System"* in European Patent Application No. 891 184 58.2. This application sets out some of the details of Motorola's proposed "Iridium TM" communication system. The Iridium TM system is currently designed to utilize sixty-six (66) satellites in low Earth orbit which would generate relatively large footprints of radio beams due to their extremely low mask angle of eight and one half degrees (8½°). Because of these very large footprints, the communications capacity that may be offered by the Motorola network would be substantially constrained. In addition, this system would employ "satellite-fixed cells" which are not defined by any constant boundaries on the Earth. These cells would sweep over vast regions of the Earth at very high speeds as the Iridium TM satellites fly overhead. This method of using satellite-fixed cells introduces extremely complicated "hand-off" problems when one satellite moves out of range of supplying service with a subscriber. At that time, another satellite must assume the responsibility of supporting the subscriber's call without interruption.

In an article entitled *"A Multibeam Active Antenna for an European Contiguous Coverage at Ku-Band"* published in the *Proceedings of the IEEE,* 1989, Bartolucci et al. discuss active multibeam antennas for European coverage at Ku-bands.

Acampora et al. explain their *"Metropolitan Area Radio System Using Scanning Pencil Beams"* in the 1991 edition of the *Proceedings of the IEEE.* The authors of this paper propose a metropolitan area radio system that would provide continuous 360 degree coverage over a large service region from a centrally located base station. The authors claim that this approach differs from others in that the base station would blanket the service region with a raster of very narrow pencil beams which could be rapidly scanned to any position in synchronism with the switching sequences of a TDMA assignment.

In the article entitled *"Advanced Communications Technology Satellite (ACTS) and Potential System Applications"* published in the July, 1990 edition of the *Proceedings of the IEEE,* Wright et al. describe an Advanced Communications Technology Satellite System and potential satellite communications scenarios.

Direct world-wide telephone services via satellite that are currently available to persons using portable, mobile and fixed terminals are extremely limited and too expensive for use by all but a few. The problem of providing an economically viable satellite network for voice, data, and video which can be used by subscribers around the globe has presented a major challenge to the communications business. The development of a high power satellite system which can transmit and receive radio signals to portable, mobile, and fixed terminals on the land and sea and in the air without the intermediate steps of routing traffic through land-based equipment would constitute a major technological advance and would satisfy a long felt need within the electronics and telephone industries.

SUMMARY OF THE INVENTION

The methods and apparatus described and claimed below pertain to the allocation of radio beams which are generated by a constellation of satellites orbiting below geosynchronous altitude. These beams are precisely controlled so that they illuminate "Earth-fixed cells", as opposed to "satellite-fixed cells." In previous satellite communication schemes, spacecraft which are not held stationary over one particular location on the Earth in geo-synchronous orbits fly over large regions of the Earth very rapidly. The radio beams generated by these fast moving spacecraft sweep across vast regions of the Earth's surface at the same rate of speed. If these beams were visible to the eye, they would paint bright circular and elliptical patches of light on the ground beneath the satellite which emitted them. In a system that employs satellite-fixed cells, the "footprint" of the radio beams propagated by the spacecraft defines the zone on the ground called a "cell" which is illuminated by the spacecraft. This satellite-fixed cell moves constantly as the spacecraft orbits around the globe.

In sharp contrast, an "Earth-fixed cell" is a stationary region mapped to an "Earth-fixed grid" that has permanent fixed boundaries, just as a city or a state. Although the rapidly moving satellites still shine their radio beams over the ground in rapidly moving footprints, the locations of the footprints at any given time do not determine the location of the unchanging Earth-fixed cells. The great advantage provided by using cells having boundaries that are fixed with respect to an Earth-fixed grid is realized when a subscriber being served by one satellite must switch to another beam in the same satellite or to a second satellite because the first is moving out of range below the local horizon. With satellite-fixed cells, this "hand-off" involves the assignment to the terminal of a new communication channel within the new beam or new satellite.

This assignment process takes time and consumes processing capacity at both the terminal and the satellite. It is also subject to blocking, call interruption, and call dropping if there is not an idle communication channel in the next serving beam or satellite. The Earth-fixed cell method avoids these problems by allocating communication channels (frequency, code, and/or time slot) on an Earth-fixed cell basis rather than on a satellite-fixed cell basis. Regardless of which satellite/beam is currently serving a particular cell, the terminal maintains the same channel assignment, thus substantially eliminating the "hand-off" problem.

The present invention uses software that provides position and attitude information about each satellite in the constellation. The Earth's surface is initially mapped into an unchanging "Earth-fixed grid" which each satellite can accurately locate from its position data. Each satellite is capable of steering, transmitting and receiving beams conveying packets of information to the Earth-fixed grid. The beams are continually adjusted to compensate the effects of satellite motion, attitude changes, and the rotation of the Earth. In accordance with one of the preferred embodiments of the invention, each spacecraft possesses the following capabilities:

to determine in which cell a terminal is located;
to read the destination of each incoming communication packet to determine the cell to which it is directed;
to map from destination cell to the beam currently serving the cell;

to switch packets to the beam currently serving the destination cell;

to "hand-off" a terminal from one beam to the next or from one satellite to the next without changing the channel assignment of the terminal; and to manage the assignment and release of channels within each cell by the satellite currently responsible for the cell.

The *Earth-Fixed Cell Beam Management* methods described in this specification and illustrated in the drawings which accompany them may be implemented using a wide variety of satellite hardware. One of the preferred embodiments of the invention employs a modular spacecraft design. An alternative embodiment utilizes a spacecraft called "Domesat TM ". Both satellites are described in detail below.

An appreciation of other aims and objectives of the present invention and a more complete and comprehensive understanding of this invention may be achieved by studying the following description of a preferred embodiment and by referring to the accompanying drawings.

BRIEF DESCRIPTION OF THE DRAWINGS

FIG. 3a shows the relationship between a satellite footprint and an unchanging Earth-fixed grid. FIG. 3b shows how the Earth-fixed grid pictured in FIG. 3a comprises Earth-fixed supercells, and how each supercell includes nine Earth-fixed cells.

FIGS. 9a, 9b and 9c depict a cell scan pattern, a cell scan cycle, and channel multiplexing in a cell.

A DETAILED DESCRIPTION OF PREFERRED AND ALTERNATE EMBODIMENTS

System Overview

The present invention is designed for use with a constellation of satellites operating in low Earth orbit (LEO). This system is designed to provide a high capacity network which provides its subscribers around the world with a wide range of modern telecommunication services at quality levels and prices that are equivalent to current terrestrial systems. The network will supply switched digital connections at multiples of a 16 kilobits per second (Kbps) basic channel rate up to 2 megabits per second (Mbps). This basic channel rate was selected for its ability to furnish network quality voice, as well as a variety of data, facsimile, and other services. Higher rate channels support the wide range of services available with the integrated services digital network standards (ISDN). The constellation will also accommodate broadband channels up to DS-3 rates between its gateways for domestic and international toll and private service. The network that incorporates the present invention is designed to handle a peak load in excess of 2,000,000 simultaneous full-duplex connections, corresponding to over 20,000,000 subscribers at typical "wireline" business usage levels.

The preferred embodiment of the constellation comprises 840 substantially identical satellites which are deployed at an altitude of 700 km (435 miles). They occupy 21 orbital planes inclined at 98.2 degrees to the Equator, with adjacent ascending nodes spaced at 9.5 degrees. At this inclination, each satellite presents the same face to the Sun at all seasons. This sun-synchronous orbit allows significant savings in solar power arrays and allows parts of the satellite's electronics to be cooled by radiation. In alternative embodiments, the invention utilizes orbits which have any altitude that is below the geosynchronous altitude of approximately 22,300 miles above the Earth's surface.

Each satellite is a switch node in the network and is linked with up to eight adjacent nodes to form a robust mesh topology. Portable, mobile and fixed subscriber terminals communicate directly with the satellite network which connects them with other subscriber terminals or, through a gateway interface, with a public switched network. Each satellite is equipped with onboard fast packet switches that employ routing algorithms that continuously adapt to the constantly changing positions of the satellites.

Communication links between Earth terminals and satellites use the 30/20 Gigahertz (GHz) frequency band, the lowest band with sufficient spectrum to meet the requirements imposed by the network's quality and capacity objectives. A combination of a high mask angle, high gain satellite antennas, and small cell size compensate for the rain attenuation and terrain blocking characteristics of these frequencies.

A Preferred Embodiment: An Earth-fixed grid, Supercells & Cells

Figure 1:
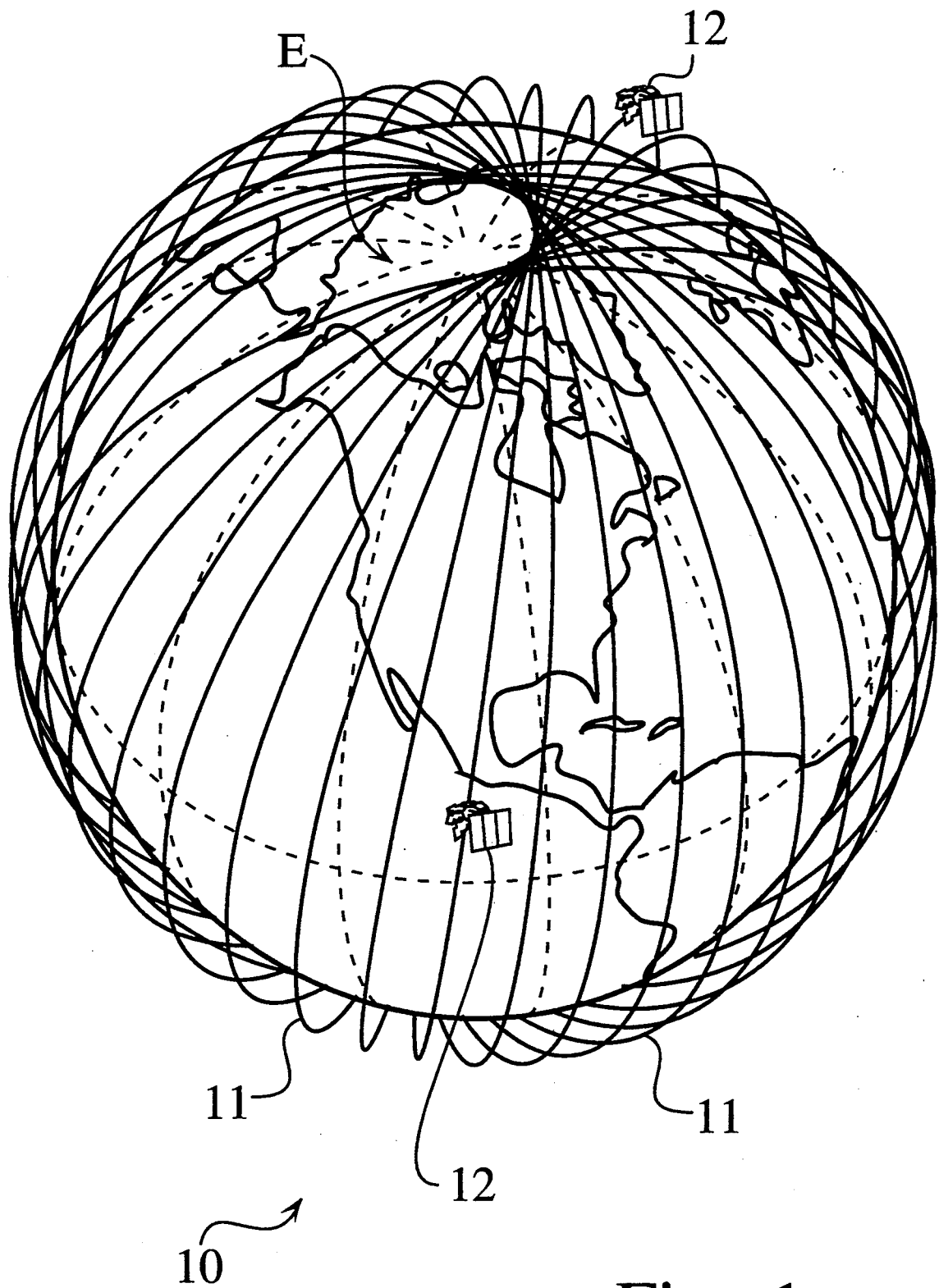
FIG. 1 is a schematic illustration of the Earth and the preferred embodiment of the satellite constellation operating below geosynchronous altitude in twenty-one orbits.

FIG. 1 is a schematic diagram 10 which illustrates twenty-one orbits 11 which enclose the Earth E. In one of the preferred embodiments of the invention, each orbital plane contains forty active satellites 12 spaced evenly around the orbit 11, along with up to four spares. The constellation of satellites is designed so that a subscriber's terminal can "see" two or more satellites most of the time. This gives the terminal some protection against shadowing by terrain, allows load sharing among satellites, and also provides redundant coverage in the event of satellite failure. In the specification and claims which follow, the word "terminal" is used to identify portable terminals P like hand-held phones, mobile terminals M such as those mounted in vehicles and fixed terminals F like a permanently installed phone that is available for public use. These terminals are different from gateways G which are generally large terrestrial receiving stations that connect the constellation with public switched networks.

Figure 2:
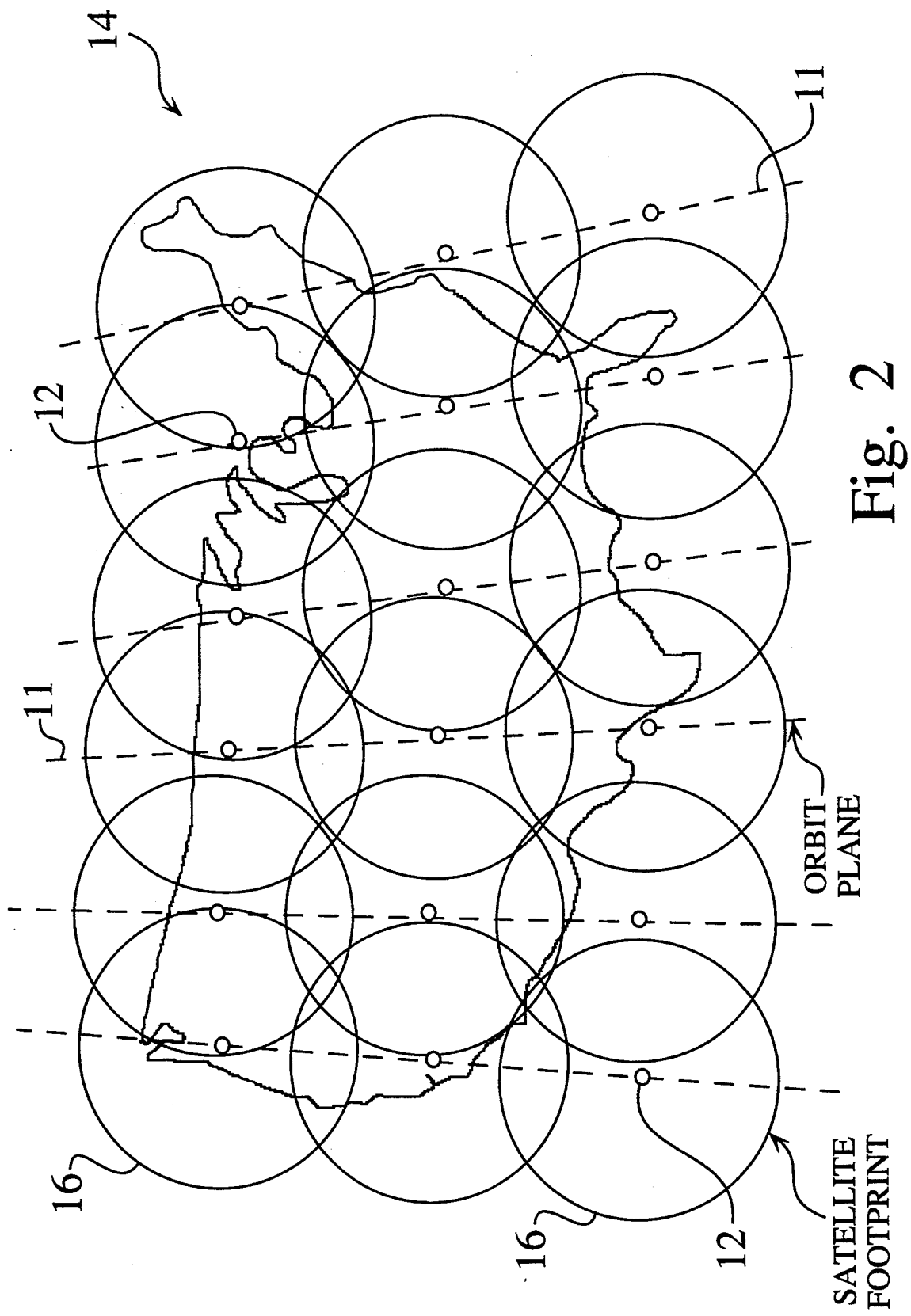
FIG. 2 depicts overlapping satellite footprints of radio beams covering the continental United States.

FIG. 2 is a diagram 14 that depicts the coverage redundancy of overlapping satellite beams called "footprints" 16 as they illuminate the continental United States. Due to the high inclination of the orbits 11, at any given time most of the satellites 12 fly over middle and high latitudes. The consequence of this orbital deployment results in the optimization of traffic-handling capacity. The footprint coverage diagram shown in FIG. 2 is based on a design feature utilized by the preferred embodiment which insures that there is at least one satellite no lower than 40 degrees above the horizon. This high "mask angle" minimizes blockage from structures and terrain, minimizes interference with terrestrial microwave links, and limits the effects of rain attenuation and multi-path reflections. In an alternative embodiment, a minimum mask angle of 15 degrees may be employed.

When the constellation is deployed, each launch vehicle carries a number of satellites. These satellites 12 are released in their proper orbit plane 11, and each satellite then adjusts its position within the plane. Onboard thrusters and an autonomous navigation system continuously monitor and adjust the satellite's altitude, attitude, and position within the orbit plane. A number of spare satellites are placed in orbit along with the first launch of active satellites.

For a satellite in low Earth orbit, the satellite footprint sweeps over the Earth's surface at approximately 25,000 km/hr. If the cell pattern of the present invention moved with the satellite footprint, a terminal would remain in one cell for only a few seconds before a channel reassignment or "hand-off" to the next cell is required. As is the case with terrestrial cellular systems, frequent hand-offs result in inefficient channel utilization, high processing costs, and lower system capacity.

FIGS. 3a and 3b illustrate one of the preferred embodiments of the invention which substantially eliminates the "hand-off" and frequency coordination problems associated with LEO networks that utilize satellite-fixed cells. FIG. 3a is a view 18 that reveals the incidence of radio beams from a satellite 12 that form a footprint 16 over California. FIG. 3b is a diagram 22 that depicts the relationships among the Earth-fixed grid 20, a supercell 24 and the nine cells 26 within the supercell 24. FIG. 3a shows an Earth-fixed grid 20 of supercells 24 covering the continental United States.

In the preferred embodiment, the Earth's surface is mapped into this Earth-fixed grid 20, which comprises approximately 20,000 "supercells" 24. Each supercell 24 contains nine cells 26. Each supercell is a square 160 km on each side, while each cell 26 is a square measuring 53.3 km on each side. The supercells 24 are arranged in bands that are parallel to the Equator. There are approximately 250 supercells 24 in the band at the Equator, and the number per band decreases in proportion to the cosine of the latitude of their location on the globe. Because the number of supercells per band is not constant, the "North-South" supercell borders in adjacent bands are not aligned. A fixed algorithmic relation defines the mapping between supercell coordinates and latitude-longitude coordinates. A "time-of-day" relation defines which orbital plane has primary coverage responsibility for each supercell 24, and the satellites' orbital position completes the "Earth-coordinates-to-serving-satellite" relation. This relation makes it possible to determine at any time which satellite has primary coverage responsibility for a terminal based on the terminal location.

The relatively small fixed cells of the preferred embodiment also provide a means to contour service areas to country boundaries, which is impossible to do with large moving satellite-fixed cells. The present invention utilizes a cell database which defines the type of service allowed within each cell, and can be used to turn off service on a country-by-country basis, or to avoid interference with radio astronomy or other specific sites.

Each footprint 16 encompasses a maximum of 64 supercells, or 576 cells. The actual number of cells 26 for which a satellite is responsible is a variable that depends on satellite location and spacing between satellites. As a satellite passes over, it steers its antenna beams to the fixed cell locations within its footprint. This beam steering compensates for the satellite's motion as well as for the Earth's rotation. As an analogous example, the beam steering method employed by each satellite to track a cell as the satellite flies overhead is similar to the motion of the tread of a bulldozer over the ground. Each spot on the tread remains in contact with a single point on the ground while the bulldozer moves along. Frequencies and time slots are associated with each cell and are managed by the current "serving" satellite. As long as a terminal remains within the cell, it maintains the same channel assignment for the duration of a call, regardless of how many satellites and beams are involved. Channel reassignments become the exception rather than the normal case, thus eliminating much of the frequency coordination and hand-off overhead.

The high minimum mask angle of 15 degrees employed in one of the embodiments of the invention results in a small satellite footprint and the large number of satellites in the constellation. Another embodiment of the invention employs an even higher mask angle of 40 degrees. For the case of the 40 degree mask angle, the peak density is 0.5 of the simultaneous basic rate channels/km² averaged over a cell. For the case of a 40 degree mask angle and a 53.3 km-square cell, 1,440 channels are employed which would serve over 14,000 typical business subscribers.

Figure 4:
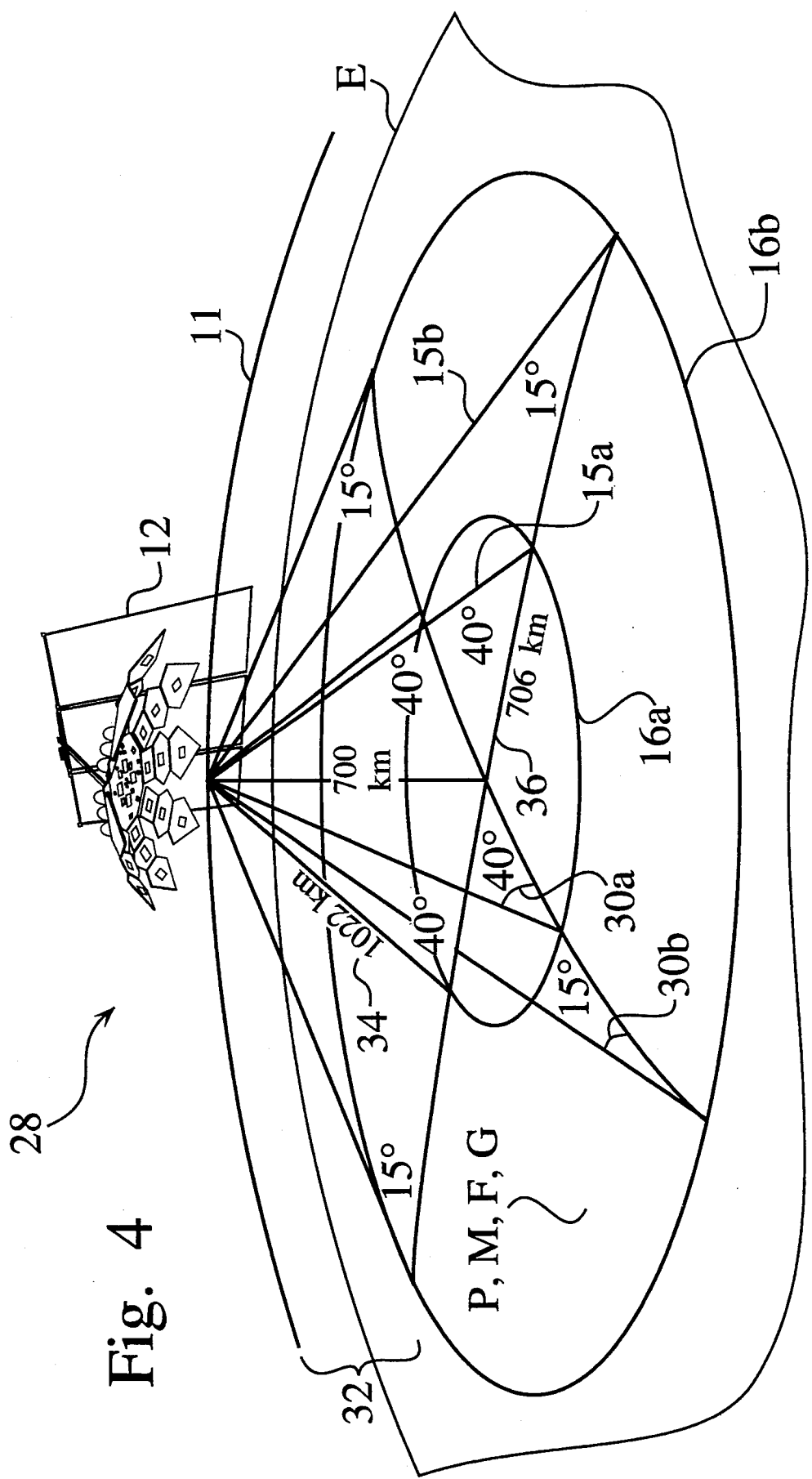
FIG. 4 reveals a single satellite and the footprint it produces on the Earth's surface directly below it. This figure also identifies the high mask angles employed by various embodiments of the constellation.

FIG. 4 is a drawing 28 which reveals two footprints 16a and 16b that correspond to the use of mask angles 30a and 30b of forty degrees and fifteen degrees. In both instances, the altitude 32 of the satellite 12 is shown as 700 km. The maximum distance to the footprint perimeter 34 from the satellite 12 is 1,022 km when the forty degree mask angle is employed, and the radius 36 of the footprint 16a is 706 km. The presence of portable, mobile and fixed terminals and gateways within the footprint are indicated by the reference characters P, F, M and G.

The satellite footprint 16 comprises a collection of contiguous cells 26, and is somewhat analogous to a terrestrial cellular system. Each cell 26 supports a number of communication channels. Terminals within the cell 26 share these channels using a combination of multiple-access methods that are described in more detail below. Cells are arranged in a pattern which allows frequencies and time slots to be reused many times within a satellite footprint 16 without interference between adjacent cells 26. The high gain satellite antennas that will be employed by the preferred embodiment produce small cells (53.3 km on each side) which result in extremely efficient use of spectrum, high channel density and low power requirements.

Figure 5:
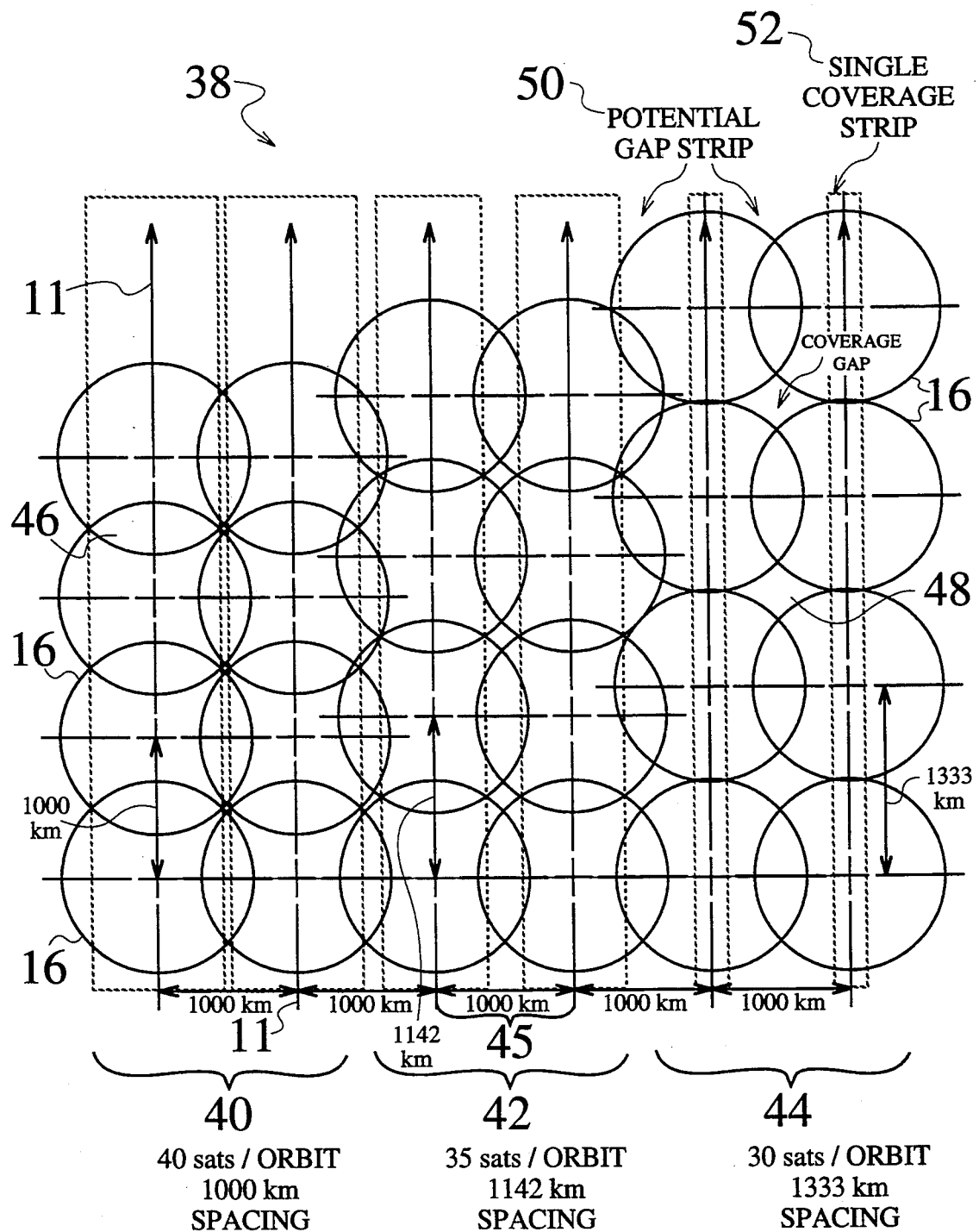
FIG. 5 portrays coverage provided by satellite footprints in one of the preferred embodiments of the invention and the overlaps and gaps formed by these footprints at the Equator.
Figure 6:
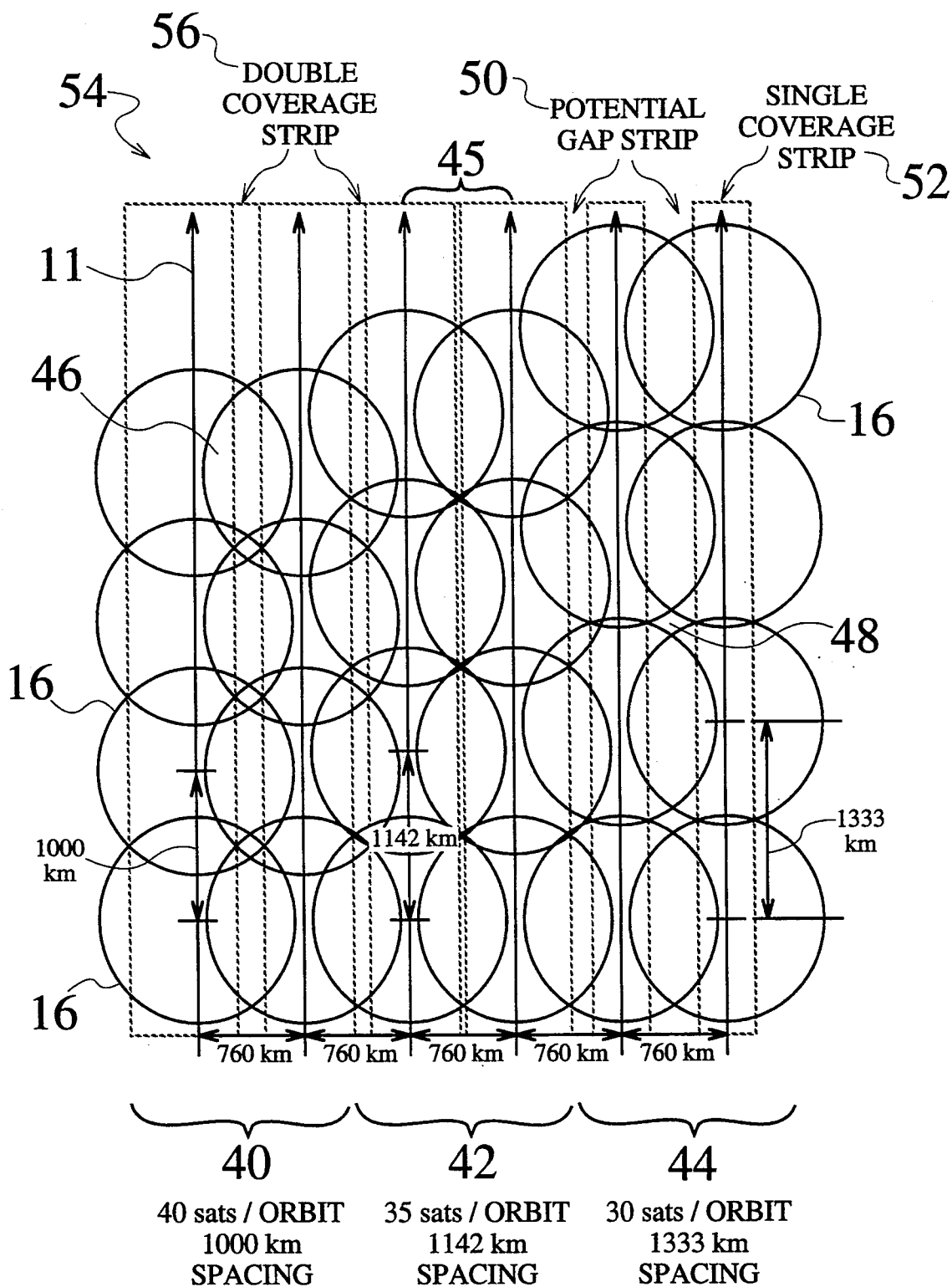
FIG. 6 portrays coverage provided by satellite footprints in one of the preferred embodiments of the invention and the overlaps and gaps formed by these footprints at a latitude of forty degrees.

FIG. 5 is a diagram 38 which portrays coverage provided by satellite footprints 16 in one of the preferred embodiments using a spacing between orbital planes of 1,000 km measured at the Equator. The overlap 40 corresponds to a network that employs forty satellites per orbit at 1,000 km spacing, while overlaps 42 and 44 correspond to networks using 35 satellites per orbit at 1,142 km spacing and 30 satellites per orbit at 1,333 km spacing, respectively. The distances between the footprint centers are delineated by reference numeral 45, the overlaps are indicated by 46, and the gaps by 48. Potential gap strips 50 and single coverage strips 52 are also illustrated. FIG. 6 reveals a similar diagram 54 that depicts satellite footprint overlaps and gaps at 40 degree latitude where the spacing between orbital planes is approximately 760 km. A double coverage strip 56 is also shown.

Figure 7A:
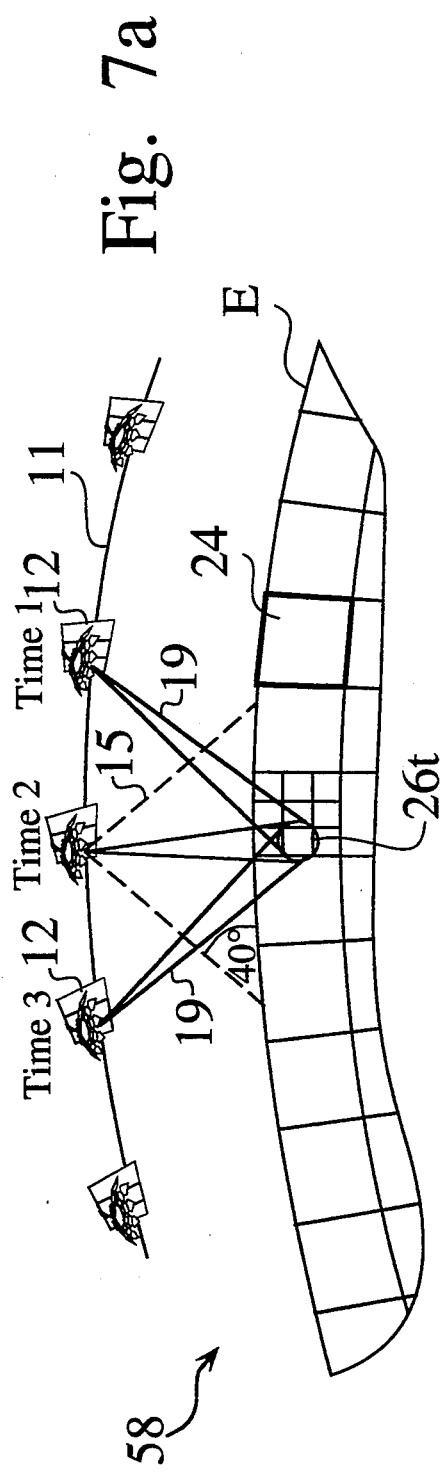
FIG. 7a is a schematic diagram that shows a single satellite flying over a single Earth-fixed cell in three sequential positions. At each of the three positions marked Time 1, Time 2 and Time 3, the satellite steers beams to a subscriber using a mobile, portable or fixed terminal or gateway over a frequency channel that does not change. The satellites shown in FIG. 7a are configured to operate using minimum mask angles of 15 and 40 degrees.

FIG. 7a is a schematic diagram 58 that shows a single satellite 12 flying over a target Earth-fixed cell 26t in three sequential positions. At each of the three positions marked Time 1, Time 2 and Time 3, the satellite 12 steers beams 19 to a subscriber in a target Earth-fixed cell 26t using a mobile, portable or fixed terminal or a gateway which communicate with the satellite using a frequency channel that does not change.

Figure 7B:
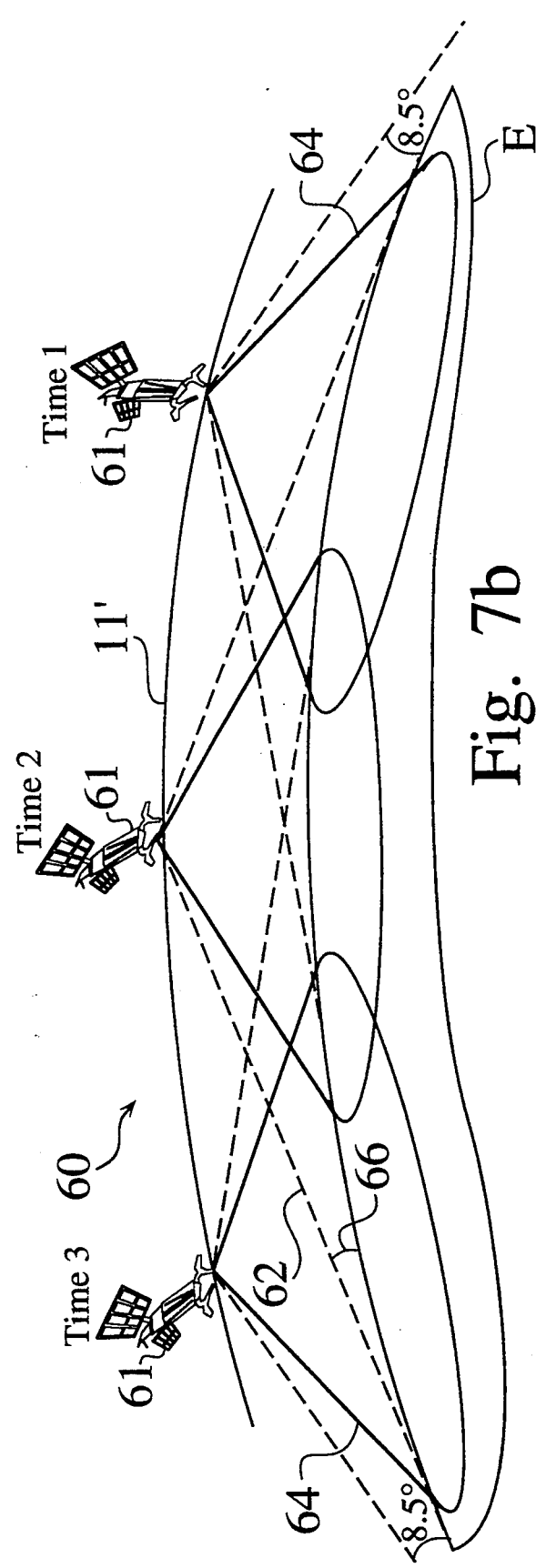
FIG. 7b is an illustration of a communication system that uses satellite-fixed cells and a mask angle of 8.5 degrees.

In stark contrast, FIG. 7b is a diagram 60 of a different satellite 61 which does not implement the present invention because it uses satellite-fixed cells (SFC). Much larger footprint beams 62 result from the extremely low mask angle 66 of eight and one half degrees. In FIG. 7a, a satellite 12 using the Earth-fixed cells method applies steering techniques to point cell beams 19 to regions on the ground. In FIG. 7b, a satellite 61 uses the satellite-fixed cell method to create beams 62 and footprints 64 that move past particular locations on the ground as the satellite 61 moves across the sky overhead.

Figure 7C:
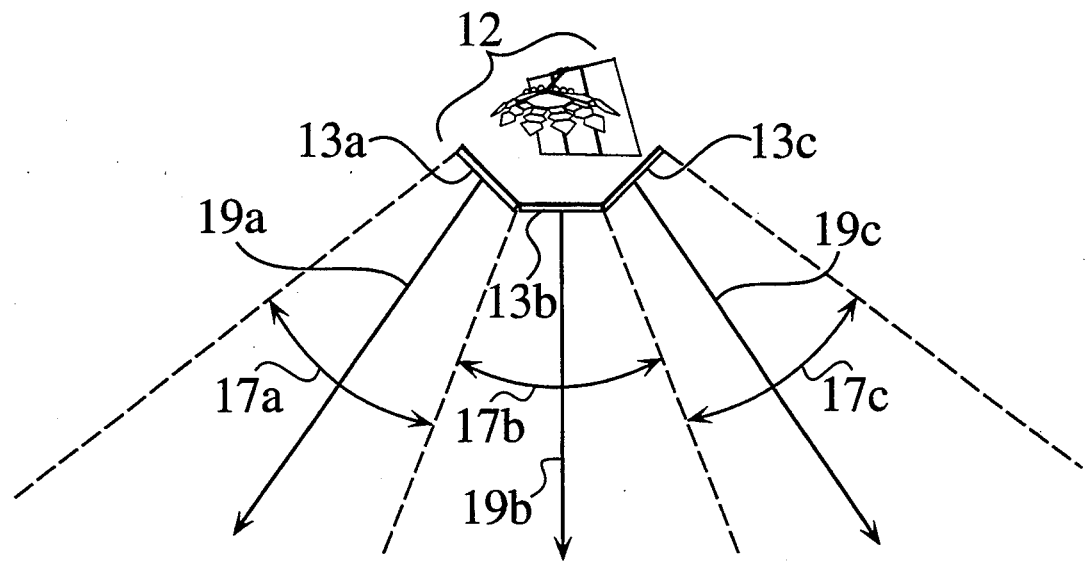
FIGS. 7c is a schematic diagram of three simplified satellite antenna elements that resemble one-half of a hexagon.

FIG. 7c is a schematic diagram of three satellite antenna elements. For the sake of simplicity, these three elements, which resemble the lower half of a hexagon, are used to show how beams 19a, 19b and 19c are steered to cells on the ground. In the actual implementation of the invention, antennas 158 and 160 shown in FIG. 11 and described below may be utilized. Antennas located on each of these three elements 13a, 13b and 13c transmit and receive Earth-fixed cell beams 19a, 19b and 19c in directions that are generally perpendicular to the surface of each element. Electronic beam steering is used to alter the direction of the Earth-fixed cell beams 19a, 19b and 19c so that antennas residing on each element 13a, 13b and 13c are capable of transmitting or receiving over the spatial ranges delineated by angles 17a, 17b and 17c. The beam steering may be accomplished by using time delay and phase shift networks and phased array antenna technology which are all well known to persons skilled in the antenna arts.

Figure 7D:
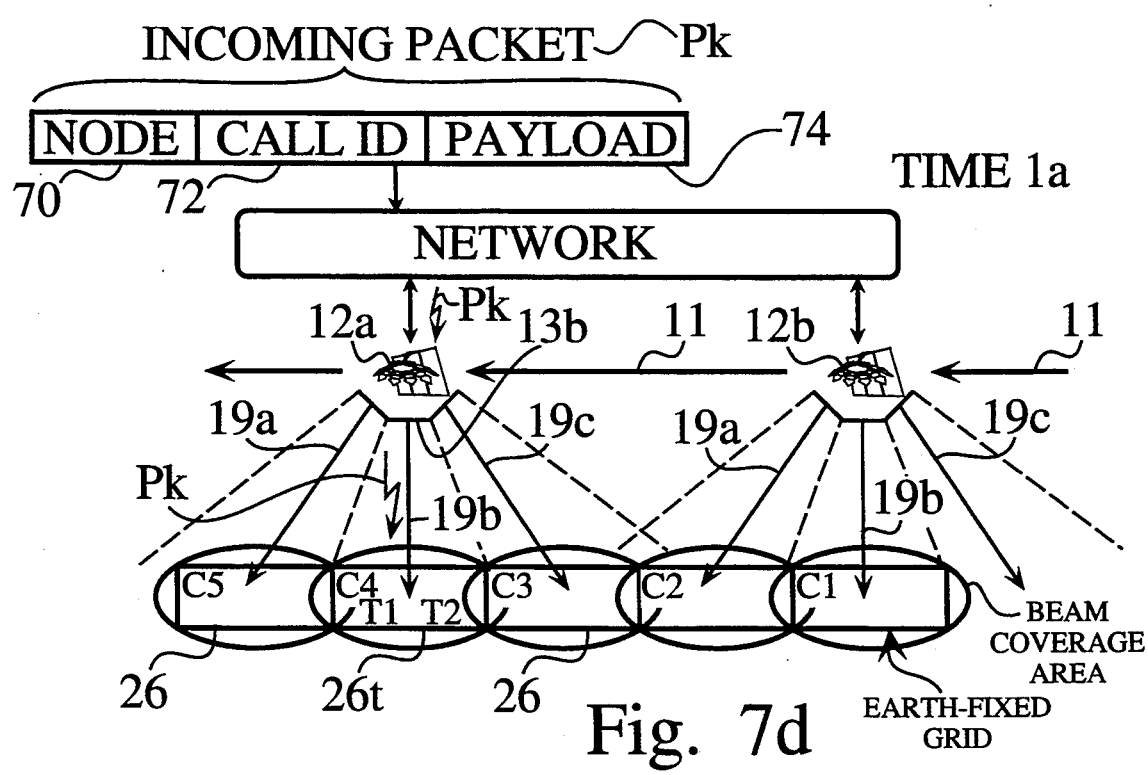
FIGS. 7d, 7e, 7f, 7g, 7h and 7i reveal a sequence of views which compare the Earth-fixed cell and satellite-fixed cell methods.
Figure 7E:
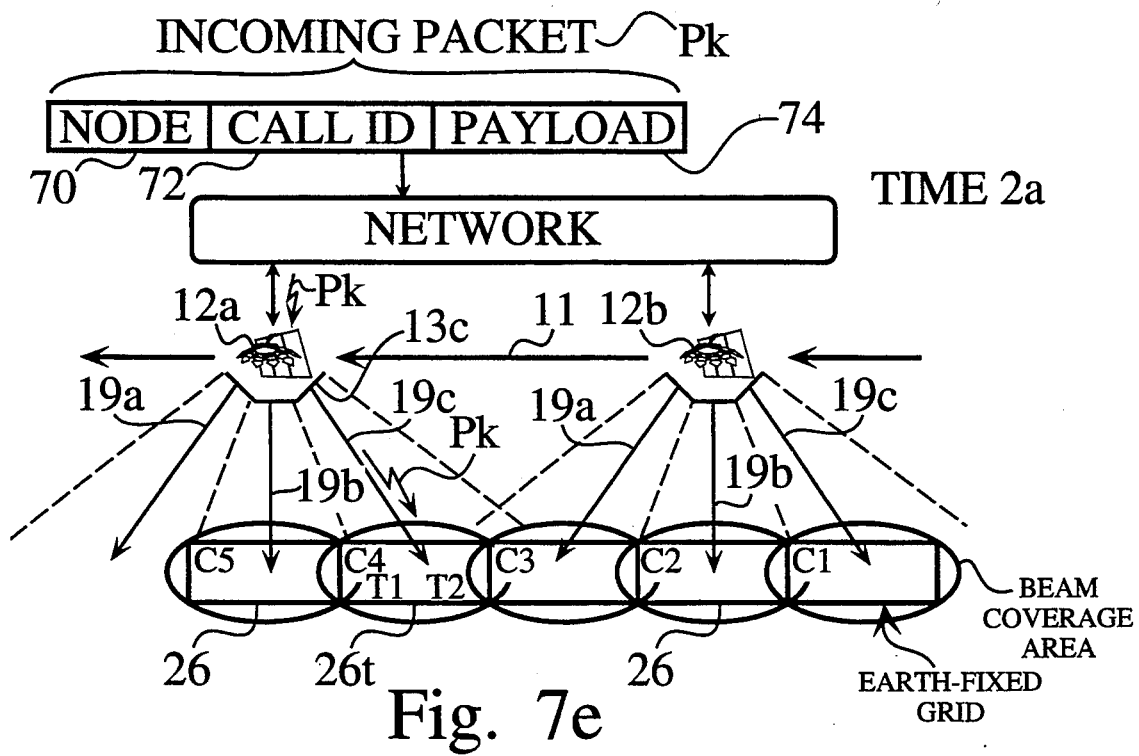
Figure 7F:
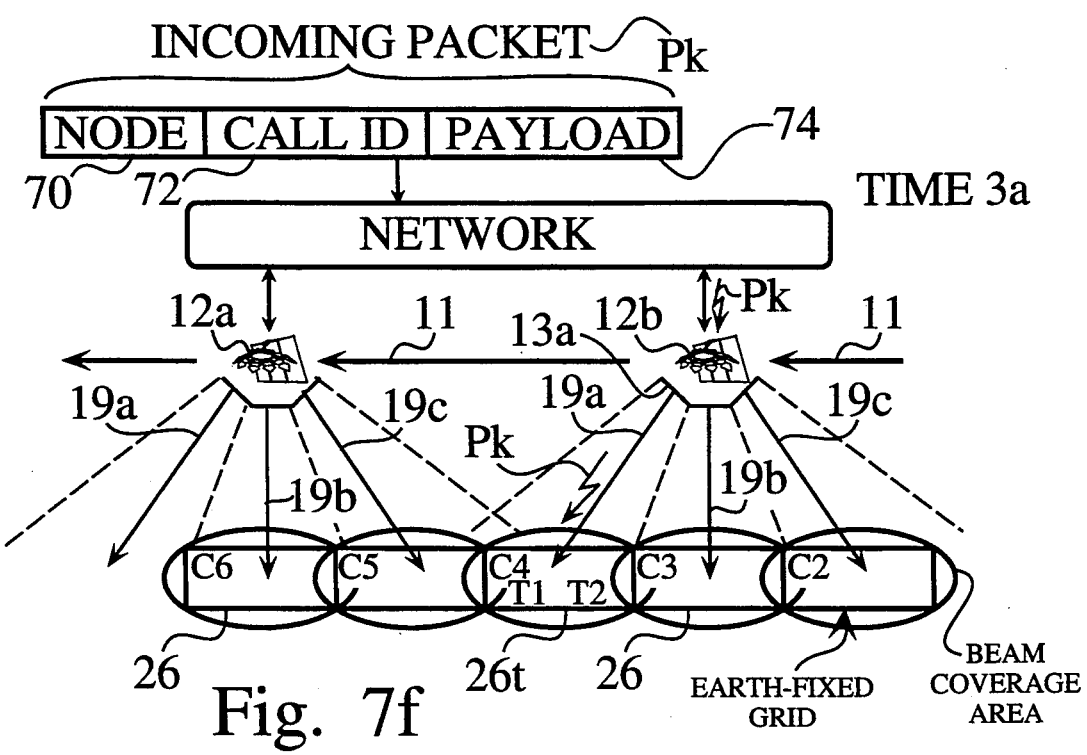

FIGS. 7d, 7e and 7f are simplified views of a hand-off process utilized by the present invention. In each of these three views, two satellites employed by the present invention 12a and 12b flying in the same orbit 11 use three antenna elements like those shown in FIG. 7c to direct packets Pk to subscribers on the ground in a target Earth-fixed cell 26t. Each packet Pk carries a header and a message "payload" 74. The header includes address information comprising a "destination node" 70 and a "call ID" 72. In each of these three drawings, incoming packets Pk have been routed through the network to satellites 12a or 12b on their way to subscribers located in cell 26t using terminals T1 and T2. In this example, these terminals do not change positions, and therefore, remain in the same Earth-fixed cell 26t, which is also identified as C4.

FIG. 7d is a "snapshot" of satellites 12a and 12b at time 1a. FIGS. 7e and 7f are similar snapshots of the same satellites, but at slightly later successive times 2a and 3b. In FIG. 7d, beams 19b from the central antenna element 13b of satellite 12a provide service to fixed location terminals T1 and T2 in target cell 26t (C4). At slightly later time 2a which is pictured in FIG. 7e, satellite 12a has moved farther away from the terminals in target cell 26t, but the electronic beam steering circuits aboard satellite 12a have switched the service to the same terminals T1 and T2 to a different antenna panel 13c. This "antenna-to-antenna" hand-off is completely undetected by the subscribers using terminals T1 and T2, who continue to enjoy uninterrupted service via beam 19c without changing their assigned communication channel. At an even later time 3a, which is frozen in the view offered by FIG. 7f, satellite 12a has moved out of range of the unmoving cell C4 in which terminals T1 and T2 are located. Before satellite 12a is no longer capable of servicing T1 and T2, the satellites 12a and 12b cooperatively hand-off responsibility for continuing the supply of packets Pk to these subscribers, and 12b assumes control of the call traffic to T1 and T2 using its own antenna panel 13a and its own beam 19a. Since T1 and T2 remain within their original cell 26t, they maintain the same channel assignment, unlike the rapid hand-offs that would be required if satellite-fixed cells were involved. The simplification of the hand-off process results from the fact that terminals stay in the same cell even though the satellites move. Communication resources are allocated on a cell by cell basis.

The specific algorithm that is employed by the preferred embodiment of the invention involves measuring and comparing the distances between the first satellite 12a that is serving a target Earth-fixed cell 26t at a given time, and the distance between a second next satellite 12b and the target cell 26t. When the distance between the centroid of the target cell 26t to the second next satellite 12b is less than the distance from the same centroid to the first satellite 12a, the satellite-to-satellite hand-off occurs.

Figure 7G:
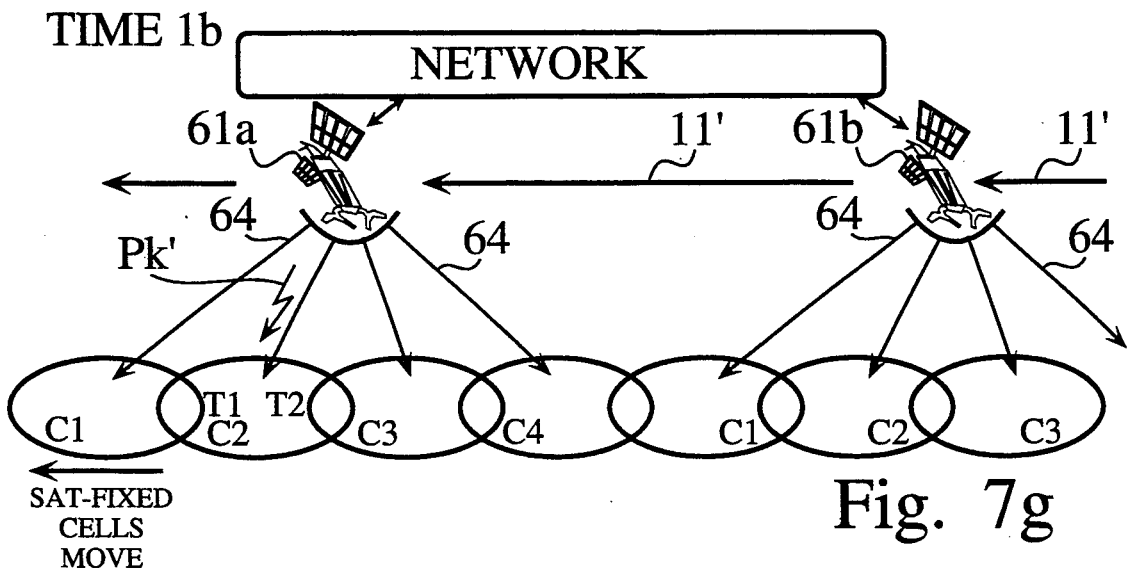
Figure 7H:
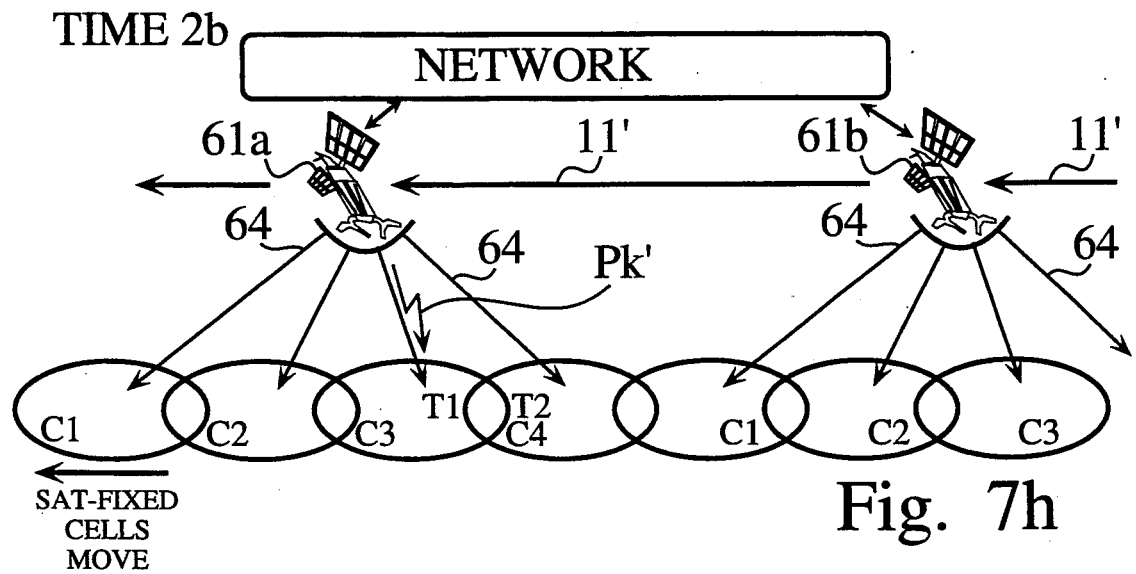
Figure 7I:
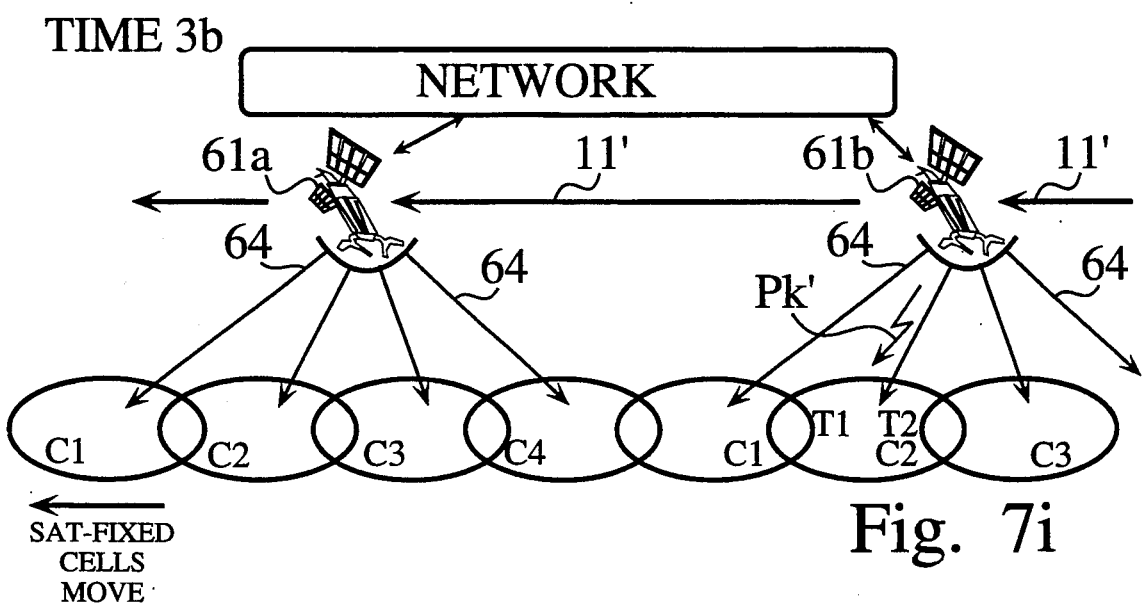

In stark contrast, FIGS. 7g, 7h and 7i reveal the deleterious consequences of furnishing the same service to two fixed location terminals T1 and T2 using a communication system that employs satellite-fixed cells, instead of the Earth-fixed cells scenario pictured in FIGS. 7d, 7e and 7f. Satellites 61a and 61b are shown in orbits 11' communicating with terminals T1 and T2 via beams 64 at successive times 1b, 2b and 3b. In FIG. 7g, T1 and T2 are illuminated by cell C2 of satellite 61a at time 1b. In this system, however, the cells move along with the satellites 61a and 61b, and continually sweep over the Earth's surface. As shown in FIG. 7h, at time 2b, T1 and T2 are no longer in cell C2 of satellite 61a. At time 2b, T1 is in cell C3 of satellite 61a and T2 occupies cell C4 of satellite 61a. As a result of the motion of the cells, which each employ different frequencies to avoid signal interference, satellite 61a had to change the channel assignment for T1 when cell C2 moved past it and cell C3 moved over it. FIG. 7h shows that, on some occasions, two relatively close terminals T1 and T2 may be served by different cells. FIG. 7i reveals the situation at time 3b. Satellite 61a has moved completely out of range of T1 and T2, and cell C2 of satellite 61b has assumed responsibility for the delivery of packets Pk' (Pk' packets are those handled by a satellite system using satellite-fixed cells.) to the subscribers. FIGS. 7g, 7h and 7i exhibit the extremely complex hand-off scheme that must be used by a network using satellite-fixed cells. Each time a terminal is passed from one cell to the next it must be assigned a new communication channel (frequency). These very frequent hand-offs can result in irritating noise during a call, and, in the worst case, a complete drop-out of the call.

Figure 8A:
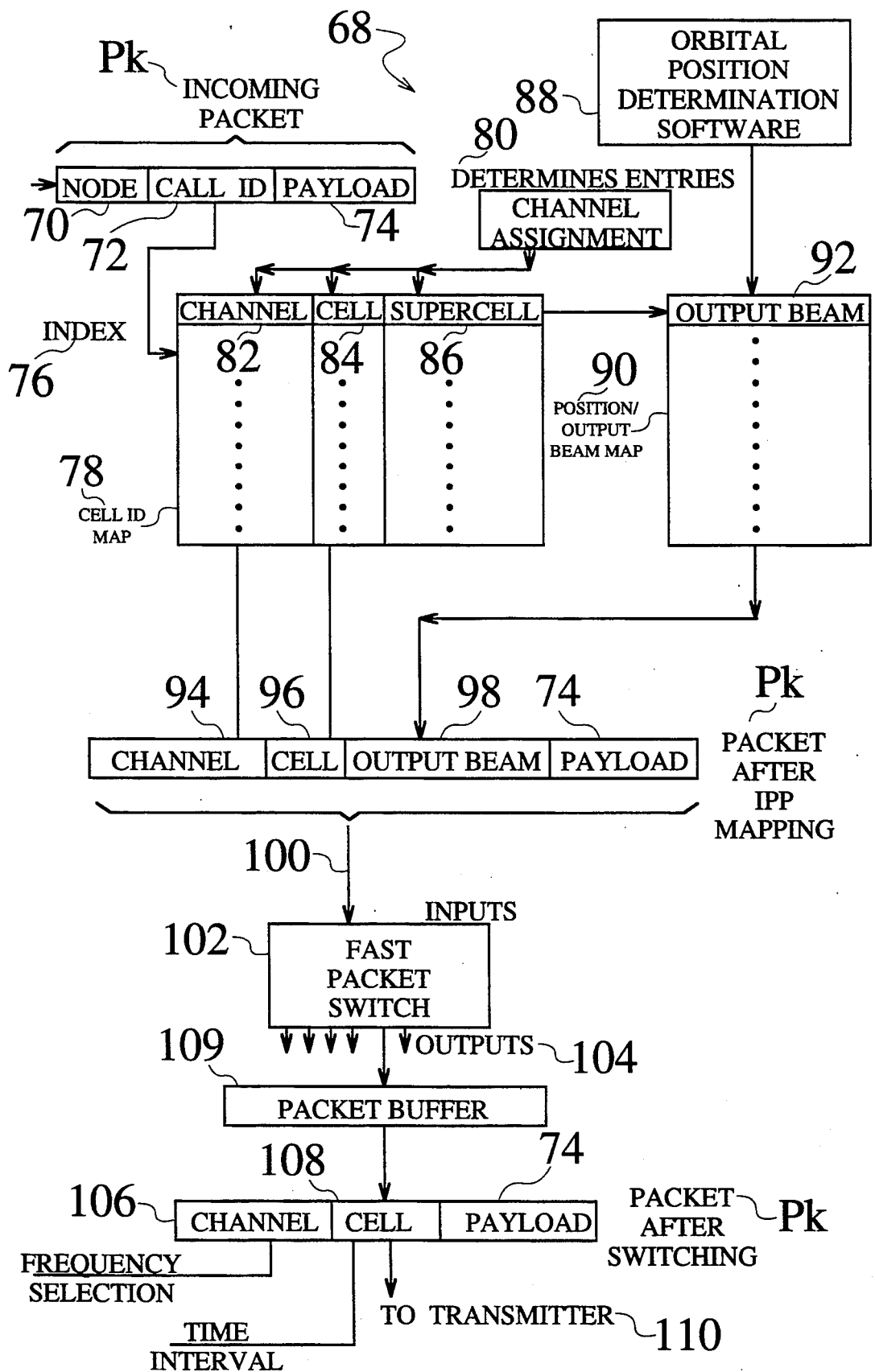
FIGS. 8a and 8b are schematic block diagrams which disclose hardware implementations of preferred embodiments of the present invention. Packets are shown as they progress through mapping and switching hardware which allocates satellite beams to subscribers in Earth-fixed cells.
Figure 8B:
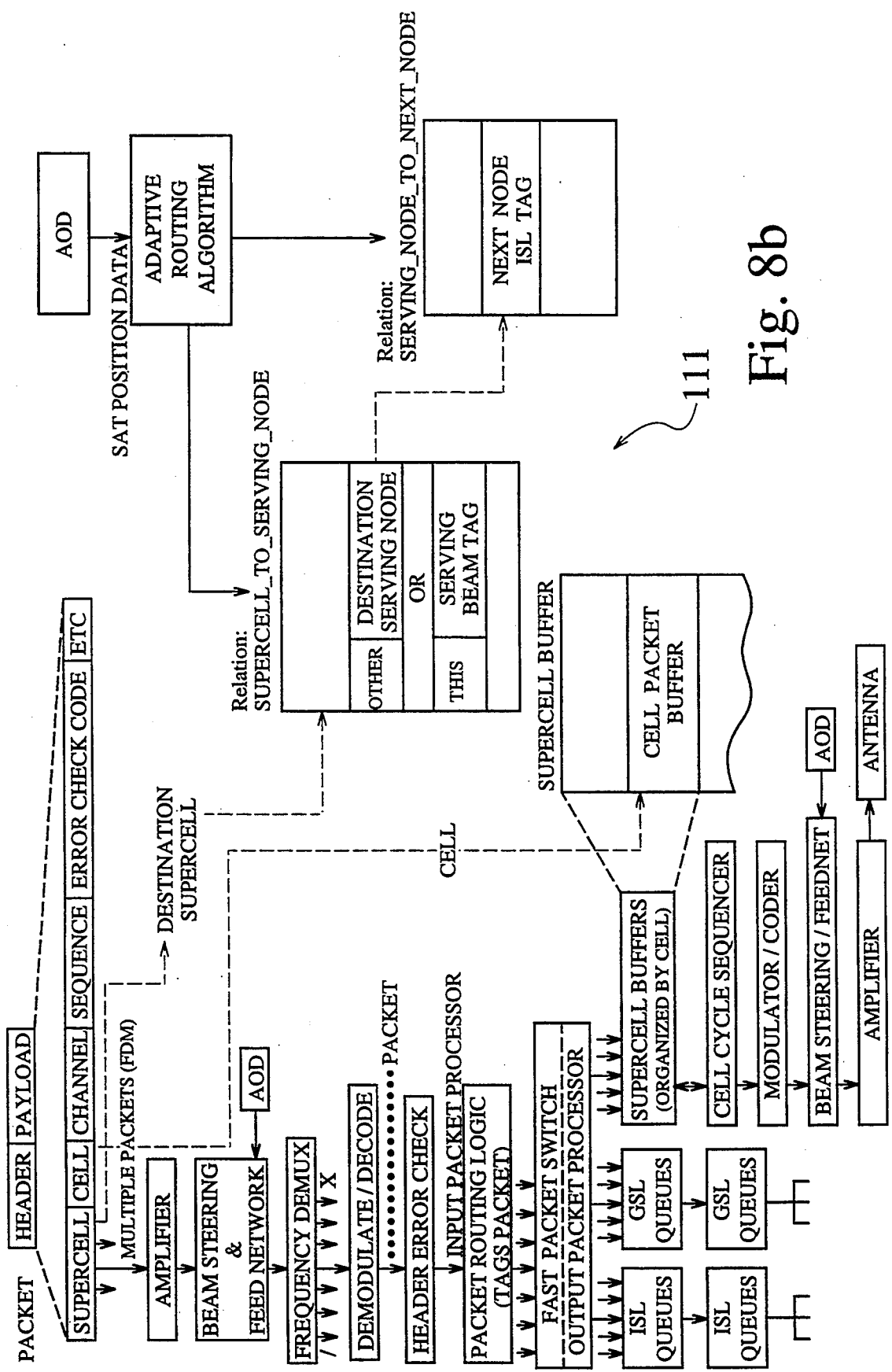

FIG. 8a is a schematic block diagram 68 which discloses a hardware implementation of one of the preferred embodiments. An incoming packet Pk is shown as it progresses through mapping and switching hardware which directs the packet Pk to the Earth-fixed cell beam 19 which is currently serving the Earth-fixed supercell 24 and cell 26 in which the destination terminal resides. The incoming packet Pk possesses node and call ID bits 70 and 72 that comprise a terrestrial location identification about the terminal where the call originated. The substance of the phone call, such as voice or video information, has been digitized and is carried as the payload portion 74 of each packet. The node 70 identifies the satellite 12 currently serving the destination terminal. The call ID 72 is used as an index 76 to a cell ID map 78, which is used as a translation device that is upstream from a fast packet switch 102 that actually selects the Earth-fixed cell beam 19 that will be used to deliver the payload 74. The cell ID map 78 identifies the supercell entry 86, cell entry 84, and channel entry 82 assigned to the destination terminal within this node 70 as identified by the call ID 72 in the incoming packet Pk. In the present context, a channel entry 82 is a portion of beam that has been allocated into several frequencies. The satellite beam which is currently assigned to serve a particular supercell entry 86 is also a function of the instantaneous position of the satellite which is generating Earth-fixed cell beams 19 to handle a given call. This position information is produced by an autonomous orbit determination (AOD) algorithm 88. The output of the cell ID map 78 is a supercell entry 86, which is used as an index to a position/output beam map 90 that, in turn, selects an output beam 92. Once the channel 94, cell 96, and output beam assignments 98 have been derived, these assignments are appended to the payload 74 of the packet Pk, replacing the call ID 72. The packet Pk is then forwarded to the fast packet switch 102 through input 100, which uses this information to direct the packet to an output 104 to a packet buffer 109. Within this buffer 109, the packet is directed to the appropriate slot in the Earth-fixed cell beam 19 currently serving a particular supercell. After the packet emerges from the switch 102, it carries a channel designation 106 that specifies some combination of time slot, frequency, coding scheme or terminal identifier, as well as a cell designation 108 that specifies a time interval. The transmitter 110 determines the frequency that will be used for the transmission of the packet based on the selected channel, and picks the time slot for transmission based on the selected cell. FIG. 8b furnishes another schematic block diagram 111 which may be utilized to implement the present invention.

A Preferred Multiple Access Method

The present invention incorporates a multiple access method to enable multiple terminals to share a common set of communication resources. The preferred embodiment uses a combination of multiple access methods to insure efficient use of these resources, as shown in FIGS. 9a, 9b and 9c. These drawings 112, 116 and 128 depict a cell scan pattern, a cell scan cycle, and channel multiplexing in a cell. Each cell 26 within a supercell 24 is assigned to one of nine equal time slots during which all communication takes place between the satellite and the terminals in that cell. The full frequency allocation is available within each cell/time slot. The cells are scanned in a regular cycle by the satellite's transmit and receive beams, resulting in time division multiple access (TDMA) among the cells 26 in a supercell 24. The scan pattern 114 shown in FIG. 9a resembles a clockwise spiral 114. The "central" cell of each supercell, shown as cell number nine in the scan pattern illustrated in FIG. 9a, is illuminated in all supercells.

Since the propagation delay varies with path length, satellite transmissions are timed to insure that cell N of all supercells receive transmissions at the same time. Terminal transmissions to a satellite are also timed to insure that transmissions from cell N of all supercells arrive at the satellite at the same time. Physical separation (space division multiple access, or SDMA) eliminates interference between cells scanned at the same time in adjacent supercells. This SDMA method is shown in the diagram 112 contained in FIG. 9a. The nine cells 118 of each supercell numbered one through nine according to the cell scan pattern run across the top of the figure, while supercells 120 numbered one through sixty-four extend down the left side of the drawing. The scan cycle 122 per supercell is 23.111 msec, and the transmit/receive time 124 per cell is 2.568 msec. Guard intervals 126 lasting 0.292 msec eliminate overlap between signals received from time-consecutive cells.

FIG. 9c is a schematic depiction 128 that portrays the details of channel multiplexing in a cell. The left side of the figure pertains to the uplink 130 and the right side of the figure pertains to the downlink 132. The bandwidth is indicated by reference numeral 142. Within each cell time slot, terminals use Frequency Division Multiple Access (FDMA) on the uplink 130 and Asynchronous Time Division Multiple Access (ATDMA) on the downlink 132. On the FDMA uplink 130 each active terminal is assigned one or more frequency slots for the call duration, and it can send one packet per slot each scan period (23.111 msec). The number of slots assigned to a terminal determines its maximum available transmission rate. One slot corresponds to a fixed terminal 16 Kbps basic channel with its 2 Kbps signaling and control channel. A 64 Kbps channel with a 8 Kbps control channel requires four frequency slots. A total of 1,440 slots per cell are available for fixed terminals, and ninety are available for mobile terminals.

The ATDMA downlink does not use a fixed assignment of time slots to terminals. During each cell scan interval, the satellite transmits a series of packets addressed to terminals within that cell. Packets are delimited by a unique bit pattern, and a terminal selects those addressed to it by examining each packet's address field. To compensate for the mobile's lower gain antenna, the bit (and packet) duration of packets sent to a mobile terminal is 16 times that for a fixed terminal. The downlink to a cell has 1,440 time slots, which support 1,440 fixed terminal packets per scan period, 90 mobile terminal packets or a combination of the two. The satellite transmits only as long as it takes to send the packets buffered for the cell. ATDMA takes advantage of the bursty nature of most communication: since packets are not transmitted during "silent" intervals, satellite power is conserved. In addition, ATDMA it minimizes packet delay because a terminal is not limited to one packet per time slot per scan.

The combination of Earth-fixed cells and multiple access methods results in high spectral efficiency. The available channel resources are reused in each supercell 20,000 times across the Earth's surface.

Satellites Employed by the Invention

Figure 10A:
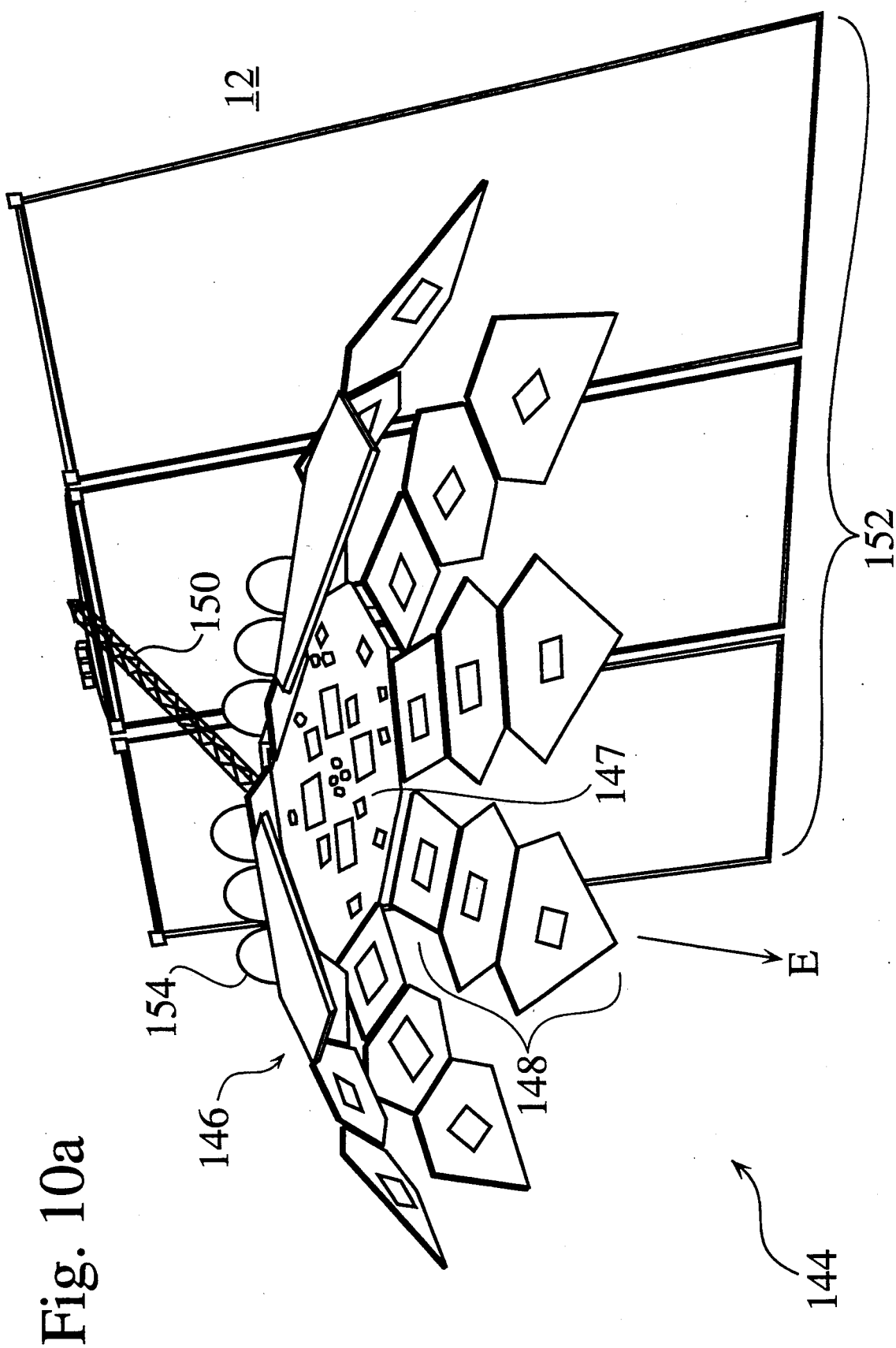
FIG. 10a is a perspective view of in orbit. This satellite, which is designed for use in the preferred embodiment of the invention, includes eight arms which unfold and extend from a central octagonal panel. Transmit and receive antennas are located on the sides of the arms that face the Earth. An array of solar cells is attached to the body of the satellite by an extendable mast. The solar cells not only supply all on-board power, but also shield the amplifiers and antennas from solar radiation.
Figure 10B:
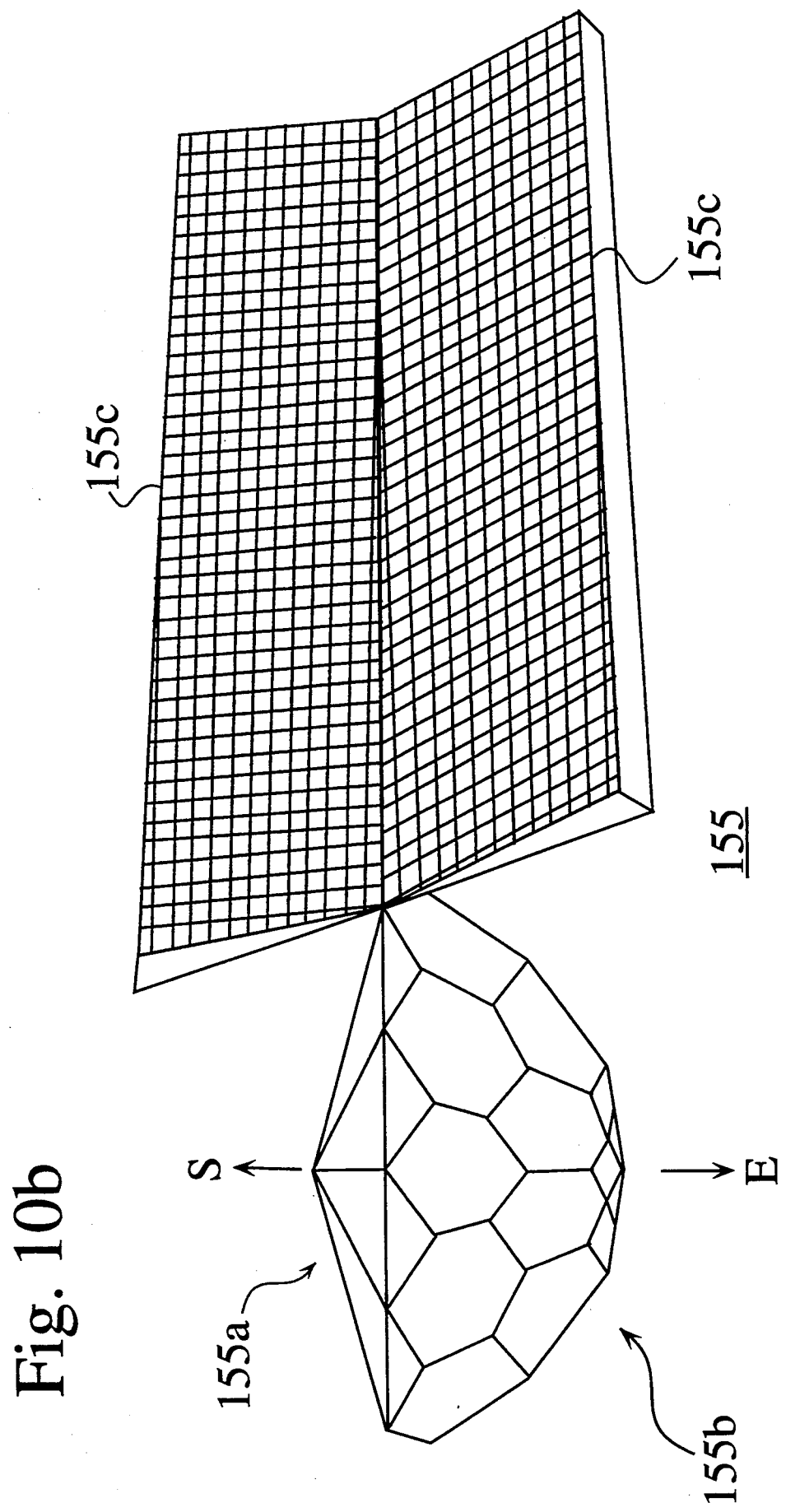
FIG. 10b is perspective view of a Domesat TM satellite that is intended for use in an alternate embodiment of the present invention. Domesat TM includes a hemispherical array of hexagonal antenna facets and rectangular solar panels.

FIG. 10a is a perspective view 144 of a satellite 146 in orbit. This design is utilized by the preferred embodiment of the invention. Another design called Domesat TM 155 is shown in FIG. 10b in a side view. Domesat TM 155 was described in detail in the parent patent application U.S. Ser. No. 07/790,318 referred to above, and may be employed in an alternative embodiment. Domesat TM includes a hemispherical array of hexagonal antenna facets and fully extended rectangular solar panels. The design shown in FIG. 10b comprises a space-facing antenna array 155a, an Earth-facing antenna array 155b, and an array of solar panels 155c which trail behind the antenna arrays.

As shown in FIG. 10a, satellite 146 comprises a body that includes eight arms 148 which unfold and extend from a central octagonal panel 147. An array 152 of solar cells is attached to the body of the satellite by an extendable mast 150. The solar cells 152 not only supply all on-board power, but also shield the amplifiers and antennas from solar radiation. Intersatellite link (ISL) antennas 154 are deployed along the top of the body of the spacecraft.

Satellite 146 incorporates light-weight high-strength materials. Electrical energy is produced by the extremely thin and light solar arrays 152 made of amorphous silicon. Thermal control techniques allow the electronics package to operate at very low temperatures, increasing electronic efficiency significantly, and greatly enhancing the life and reliability of the electronics and antennas.

Although all the satellites in the constellation are substantially identical, the solar panels 152 are adjustable and are set at launch time to the correct angle for energy collection in the satellite's intended orbit 11. Because the orbits are Sun-synchronous as explained above, the satellite's orientation with respect to the Sun is constant. The power system is designed to handle wide variations in the communication payload requirements including peak loads of over 100 times the average load.

Each satellite operates autonomously, and the constellation is managed as a "herd" rather than as individual units. The onboard orbit determination and navigation systems continuously and autonomously track and maintain each satellite's position within the constellation. Each satellite monitors its status, reports exception conditions immediately, and periodically sends reports on its vital functions to a satellite administration center. These reports, as well as other control information for the spacecraft and its systems, are handled by the network as normal packet traffic.

Figure 11:
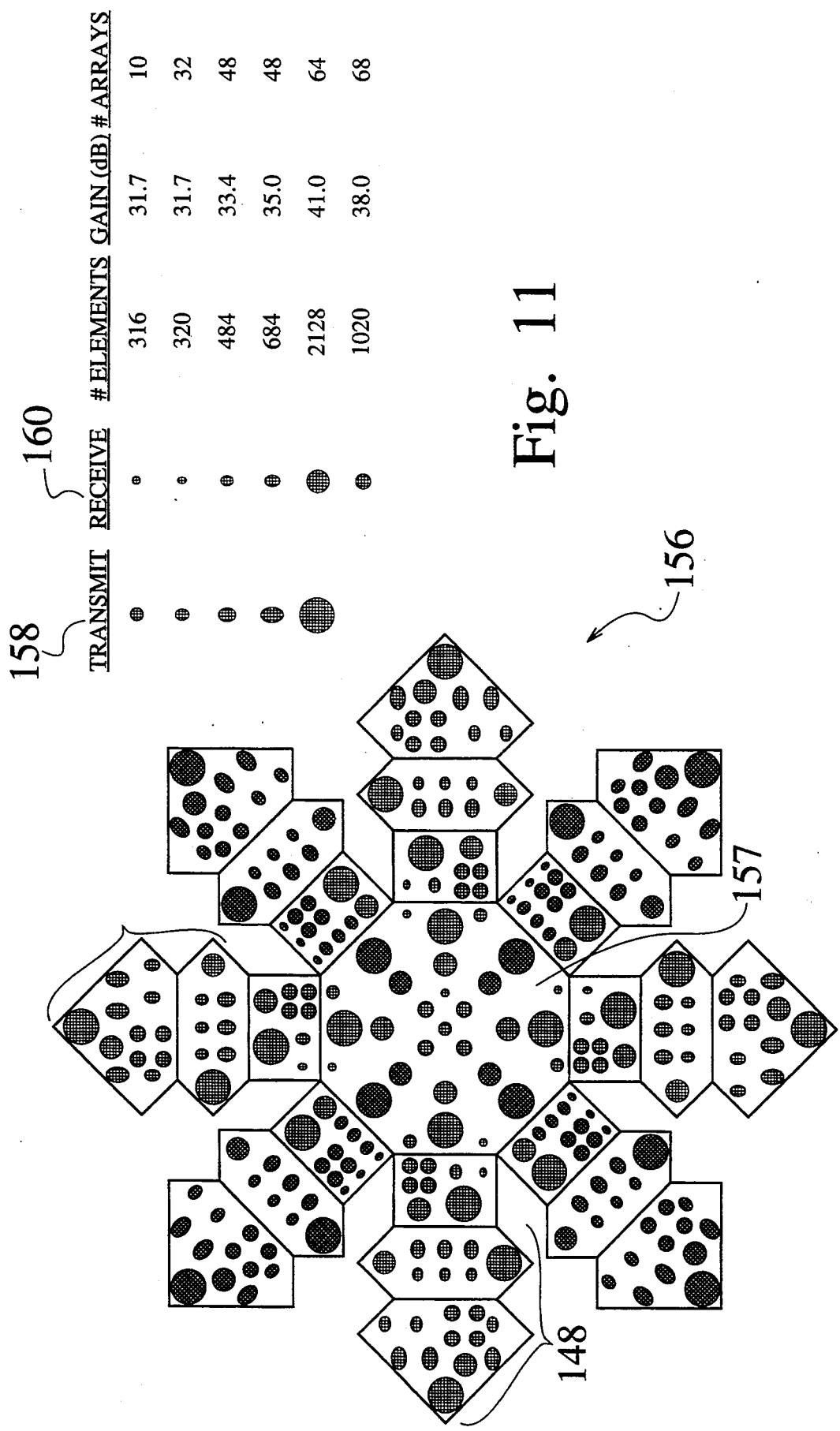
FIG. 11 is a view of the antenna panels on the "underside" of the satellite illustrated in FIG. 10a as seen from Earth.

The core of the communication payload consists of the fast packet switch 102 discussed previously, frequency synthesizer units, and a set of modems connecting the switch with the transmitter, receiver and antenna subsystems. Antennas and radio subsystems comprise the most complex and costly part of the satellite. The satellite uses a multi-panel antenna system with many facets on each panel, as depicted in FIG. 11, which portrays a view 156 of satellite 146 as seen from Earth. The underside of the central octagonal body 157 and radially extending arms 148 are covered with transmit and receive antennas 158 and 160.

The antenna panels 147, 148, 158 and 160 integrate advanced composites, ceramics, and a thermal control system into an ultra-light-weight rigid structure. The panels are deployed at angles to the Earth's surface which reduce the beam steering requirement to a few degrees. All satellite antennas 158, 160 are advanced active-element phased-array systems using GaAs MMIC amplifiers and beam steering which collectively provide dynamic control of gain, beam shape and power level. This feature allows the satellite 146 to maintain a scanning spot beam of constant shape and flux density on the Earth's surface as the satellite 146 passes overhead. More details about the preferred embodiment of the satellite 146 may be found in U.S. patent application Ser. No. 08/075,425 filed on 11 Jun. 1993.

The preferred embodiment of the Earth-fixed cells method relies on accurate knowledge of the each satellites' position and attitude, accurate timing information, precision beam steering, and adaptive routing capability. An autonomous orbit position determination (AOD) system, active phased array antennas, multiple access method, fast packet switch, and adaptive routing algorithms provide the enabling hardware.

An Alternative Embodiment of Earth-Fixed Cells

The parent patent application, U.S. Ser. No. 07/790,318, referred to above, disclosed an alternative embodiment of the invention which incorporated the Domesat TM 155 satellite described below and approximately 80,000 Earth-fixed supercells spanning the surface of the globe. In the alternative embodiment, each footprint serves up to 256 supercells. Each supercell is divided into a four by four matrix comprising four Earth-fixed cells on a side, instead of the three by three matrix used in the preferred embodiment described above. Every Earth-fixed cell in the older embodiment is twenty kilometers wide and twenty kilometers high, which resulted in approximately 1.28 million Earth-fixed cells covering the surface of the world.

In this older version, the Earth-fixed supercells are mapped into sixteen Earth-fixed cells numbered from one to sixteen. These numerals indicate the timing assignments that represent the schedule of sequential satellite transmissions that serve each cell. This cell pattern insures that three inactive cells are always present between every two active cells during normal operations. In the event of a skew in the physical alignment of supercells in adjacent bands, this pattern still provides for a minimum of two inactive cells between active cells. This separation is sufficient to eliminate signal interference between two cells which are being illuminated at the same time.

In the alternative embodiment of the invention, the time slot is 1.444 milliseconds in duration, and the frequency domain modulation cycle for the beams is 23.111 milliseconds long. The time required for communication is 1.156 milliseconds, and 0.289 milliseconds of guard time is provided. The receive beams lag the transmit beams by twice the time encountered by the transit delay between the user and the satellite. This lag time varies from 6.8 milliseconds for supercells at the edge of the footprint to 4.7 milliseconds for supercells directly below the satellite. The variation over a supercell ranges from 0.04 milliseconds for cells directly below the satellite to 0.7 milliseconds for cells at the edge of the footprint.

The beams generated by the Domesat TM antenna facets include 256 transmit and 256 receive scanning beams. The Domesat TM satellites are also deployed at an orbital height of 700 km, and utilize an optimal 40 degree mask angle, or the alternative 15 degree mask angle. The satellite footprint measures approximately 1.6 million square kilometers. The satellite antenna beams that service cells directly below the satellite have a gain of 37.7 dB and half power beamwidths of 2.6 degrees. The beams that service cells at the edge of the satellite footprint have a gain of 40 dB and half power beamwidth of 1.8 degrees. The beams illuminate circular spots on the Earth's surface of approximately 800 square kilometers. The square inscribed within this circular spot has an area of 512 square kilometers (22.6 km sides). This geometry provides 1.84 km (13%) of overlap at the cell corners. The overlap mitigates the effects of satellite position errors and beam pointing errors. The tolerable error limits are 300 meters maximum for satellite position determination error and 1.5 km (0.17 degree) maximum for beam pointing errors. The movement of the beam footprint on the Earth's surface due to the motion of the satellite is less than 12 meters over the 1.444 millisecond dwell time, and less than 200 meters during the 23.111 millisecond supercell timing cycle. Instead of computing the required pointing angles for each spot beam every 1.444 milliseconds, the pointing angles for the center of the supercell may be computed every 23.111 milliseconds, and the beam is then positioned relative to this center for each cell. The rotation of the Earth contributes an error to this computation, but is less than 6% of the effect of satellite motion, and the same method can be used to compensate for this motion. The same method can also be used to compensate for satellite attitude motion (roll, pitch, and yaw). When a supercell is contained within the footprints of two or more satellites, then the satellites negotiate among themselves as to which ones will service that supercell. One satellite may be assigned complete responsibility or the frequency allocation may be divided among several satellites. Each cell is designed to provide service for up to 720 16-kilobit per second subscribers using portable terminals, and 360 terminals operating at 64-kilobits per second.

The alternative embodiment offers several advantages over previous beam allocation systems. Terminals are served by the footprint of the satellite that happens to be passing overhead at the time a particular call flows through a given terminal. By allocating the beams to Earth-fixed cells as opposed to satellite-fixed cells, the problem of performing frequent hand-offs from satellite to satellite is substantially eliminated, since a terminal keeps the same frequency (channel) and time slot (cell) for the duration of the call even though it communicates via different beams and satellites during the call. A similar system using satellite-fixed cells with each satellite footprint partitioned into 4,000 cells would require a cell hand-off approximately every 5 seconds. The utilization of the present invention requires these undesirable hand-offs only when a subscriber using a portable or mobile terminal actually transits across a cell boundary. The Earth-fixed cell method also avoids the danger of accidentally terminating a call if all of the channels in the cell to which the beams are switched are already occupied. The allocation method of the present invention that switches a call from the beams of one satellite to another is completely transparent to the customer. The Earth-fixed cell technique also offers enormous spectral efficiency, since 100% of the frequencies between the cells and between the satellites are constantly reused. Similar systems using satellite-fixed cells often divide the assigned frequencies into bands assigned to satellites to avoid frequency conflicts. This is an inefficient use of the valuable frequency spectrum.

The Environment of the Present Invention: Switching, Routing & System Control The present invention uses fast packet switching technology similar to the Asynchronous Transfer Mode (ATM) technology now being developed for local area networks (LAN), wide area networks (WAN) and Broadband ISDN (BISDN) networks. All types of communication, including voice, data, video, signaling, etc., are treated identically within the network as streams of short fixed-length packets Pk. Each packet Pk contains a header that includes address and sequence information, an error control section used to verify the integrity of the header, and a payload section which carries the digitally-encoded voice or data. Conversion to and from the packet format takes place in the terminals and gateway interfaces. The fast packet switch network combines the advantages of a circuit-switched network (low delay digital pipes), and a packet-switched network (efficient handling of multi-rate and bursty data). The technology is ideally suited for the dynamic nature of a low Earth orbit network.

Each satellite 12 in the constellation is a node of the fast packet switch network, and has inter-satellite communication links with up to eight other satellites in the same and adjacent orbital planes. Each gateway G on the Earth's surface is also a node in the network. Each satellite 12 is normally linked with four satellites 12 within the same plane (two in front and two in back), and with one in each of the two adjacent planes on both sides. This rich interconnection arrangement forms a non-hierarchical "geodesic", or mesh, network and provides a robust network configuration that is tolerant to faults and localized congestion conditions. The satellites 12 communicate directly with fixed and mobile terminals F, M, and with gateways G. Gateways G connect traffic, inbound and outbound, to the public switched telephone network in the destination country. The gateway interface also provides the network access to various operations support, control, and database systems.

The fast packet switch 102 aboard each satellite 12 is essentially non-blocking with very low packet delay, and offers a throughput in excess of 5 Gigabits per second. Packets Pk are received on an input port from an adjacent satellite, or from a gateway G or terminal P, M, F within the satellite footprint 16. An input packet processor examines the header to determine the packet's destination and the corresponding switch output port. The input processor adds a routing tag to the packet which the self-routing section uses to direct the packet to the selected output port. The output port may be an intersatellite link leading to a distant destination, or it may lead to a local transmitter to a gateway or cell currently served by this satellite. An adaptive routing algorithm (ARA) adapts the packet routing decisions to the current network configuration and "beam-to-cell" mapping.

The topology of the LEO-based network is dynamic. Each satellite maintains the same position relative to others in the same orbital plane 11, but its position and propagation delay relative to ground terminals and to satellites in other planes changes constantly. Communication links between satellites are connected and disconnected as orbits intersect and as satellites move in and out of communication range. The changes are constant but not random. The present invention utilizes an autonomous orbit determination (AOD) system 88 that provides the precise position of each satellite to all satellites in the constellation. Position information may also be derived from the U.S. Global Positioning Satellites (GPS) which are currently in orbit and available for general use. The information is used for precise beam steering between satellites 12 and to Earth terminals, to calculate propagation delays and to determine current geographical coverage areas. This position information is derived at very low cost directly from the geometry of the constellation, without the aid of outside navigation signals.

In addition to the network's changing topology, as traffic flows through the network, queues of packets build up in the satellites, changing the waiting time before transmission to the next satellite. All of these factors affect the routing choice made by the fast packet switch 102. These decisions are made continuously within each node, using a proprietary distributed adaptive routing algorithm. This algorithm uses information broadcast throughout the network by each satellite to "learn" the current network status in order to select the least delay path to a packer's destination. The algorithm also controls the connection and disconnection of network links.

In contrast with the ATM protocol, the present invention employs a "connection-less" protocol. Packets of the same connection may follow different paths through the network, and sequence preservation is moved to the network "edges". Each node independently routes the packet along the path which currently offers the least expected delay to its destination. The terminal or gateway interface at the destination stores, and if necessary reorders, the received packets to eliminate the effect of timing variations. The deviation from the average packet delay for a connection is designed to be extremely low, and is projected to be only a few milliseconds under typical conditions.

Subscribers will be able to access the network using a wide variety of terminals, which may include hand-held phones, facsimile machines, video units and personal communicators. These terminals will be designed to operate at the basic channel rate of 16 Kbps for the message "payload", and an additional 2 Kbps channel for signaling and control. Service is envisioned for multiples of the basic rate up to 2 Mbps. The basic rate supports low delay "network quality" speech coding generally indistinguishable from today's 64 Kbps digital landline circuits. It also supports 4.8 Kbps voice-band modems, 16 Kbps digital data, and high-speed facsimile. The higher channel rates support multiple individual channels and combined high-rate channels which offer the full range of switched $N \times 64$ and multi-rate ISDN services.

In one of the preferred embodiments of the invention, the fixed terminals F use an antenna approximately 10 inches in diameter, normally mounted in a fixed position with an unobstructed path above 40 degrees. Most of the fixed terminals F will be units with connections for standard telephones, ISDN sets, private branch exchanges and/or data equipment. A group terminal option provides shared access to a small village or community of subscribers using inexpensive wireless phones.

The mobile terminals M will be small, lightweight terminals similar to existing vehicle-mounted or portable cellular telephones. They are designed to operate at low power levels and use a small, three inch diameter antenna. The mobile terminal will provide a single basic rate channel (16 Kbps payload, plus 2 Kbps signaling and control) and support network quality speech, 4.8 Kbps voice-band modems, 16 KPS digital data, and high speed facsimile. To compensate for its smaller antenna size, the mobile terminal uses more power per channel than the fixed terminal.

The gateways G will serve as the network access nodes for inbound and outbound traffic to the destination region, and for connections to network administration and control systems. Traffic sources include public or private gateway switches and full-term point-to-point transmission facilities at T-1 (1.544 Mbps) and higher rates.

The network has three categories of communication links. Intersatellite links (ISLs) which connect a satellite switch node with up to eight other nodes in the same or adjacent orbital planes. Each ISL can use from one to eight 138 Mbps channels, depending on the capacity required at any given time. Gateway-satellite links (GSLs) connect the satellite network through a gateway interface to the public network and to ground-based control, support, and database systems. Each satellite can support eight GSLs, each with a capacity of up to eight 138 Mbps channels. Terminal-satellite links (TSLs) are direct connections between terminals and the satellite-based network. Mobile Terminal-Satellite Links (MTSLs) support small, moderate gain terminals (normally mobile). Fixed Terminal Satellite Links (FTSLs) support larger, higher gain terminals (normally fixed-site). The basic channel rate is 16 Kbps for the payload plus 2 Kbps for signaling and control. Fixed terminals support multiples of the basic rate up to a 2 Mbps payload rate.

The present invention incorporates several categories and levels of system control, including call control, network control (overload, reconfiguration, etc.), billing, administration, satellite constellation control, etc. In the preferred embodiment, network control hierarchy is distributed among the network elements and modeled on the Intelligent Network prototype. Terminals and other network elements use a packet-based protocol for signaling and control messages (similar to the ISDN D-channel, and CCITT No. 7 signaling). The network handles these packets as normal traffic.

The highest levels of network control reside in distributed, ground-based systems that are connected via gateway interfaces to the satellite network. Database systems provide terminal/user feature and service profiles, authentication and encryption keys, mobile user location, call routing data and other administrative data. Administrative systems, from "network-level" to local "in-country" systems provide secure access to various levels of the database and billing data systems. In-country systems provide the local administration control of terminals in its area, while network and constellation control are restricted to the "network-level" administrative systems.

High-level call control functions reside in gateway switches and feature processors. The feature processor is a pure control element (no switching), which controls terminal-to-terminal calls as well as the initial set-up of calls involving a gateway. Only control and signaling packets are passed to the feature processor; the "speech path" is a direct network connection between the terminals. The gateway switch controls those calls connected through it. The satellite-based switch node has some mid-level call control functions in addition to its packet routing function. It manages the assignment, supervision, and release of all channels in its footprint, and the "hand-off" of channels to other satellites. It also monitors channel signal quality and initiates link power control when required. The terminals in the network have control of some low-level call control functions similar to those controlled by a cellular or ISDN functional signaling terminal. This includes user authentication, location registration, link encryption, monitoring and reporting of channel quality, channel assignments and hand-offs, D-channel signaling, etc.

APPENDIX OF TERMS & EQUATIONS

Channel Resources

The attributes that are used to distinguish between communication channels that share a common set of properties. Examples of attributes that are used to define a communication channel include signal frequency range, signal time and/or duration, signal coding, signal polarity, physical location of signal source, etc.

Communication System Resource Set

The set of resources to which a communication system is restricted to operate. For example, a communication system may be restricted to a frequency range, physical/geographic boundary, etc.

Multiple Access Method

The rules that define how multiple communication terminals share the Communication System Resource Set for their system is referred to as the Multiple Access Method. Examples include Frequency Division Multiple Access (FDMA), Time Division Multiple Access (TDMA), Code Division Multiple Access (CDMA), etc.

The present invention uses a combination of Frequency, Time, and Space Division Multiple Access Methods.

Cell (Channel Allocation Zone)

An area to which a subset of channel resources is restricted—normally to avoid interference with other cells that are assigned the same set of resources. Cells that are physically adjacent must use a different subset of channel resources (frequency, polarity, code, etc.) to avoid interference. Cells that use the same set of resources at the same time must be spatially separated to avoid interference.

Cell Pattern and Channel Resource Reuse Zone

Cells are normally arranged in a pattern (the Cell Pattern) that assures physical separation between cells using the same channel resource at the same time. The area that includes the minimum number of cells that make use of the entire communication channel resource set is sometimes referred to as the "frequency reuse zone", although it is more accurately a "Channel Resource Reuse Zone", since frequency is not the only reusable channel resource. (For the present invention the Channel Resource Reuse Zone is referred to as a Supercell). In general, the smaller the Reuse Zone, the more times the same resources can be reused within the same area, and thus the more efficient the system is at using shared resources.

Hand-off

When a terminal moves from one cell to the adjacent cell it must acquire a different set of channel resources to continue to communicate (since the new cell must use a different set of channel resources). This involves an administrative process of "negotiating" for a channel assignment. If no channel is available in the next cell, the connection will be dropped.

Satellite-fixed and Earth-fixed Cells

For a non-geostationary satellite system, the cell layout could be fixed with respect to the satellite, in which case the cell pattern moves over the Earth surface as the satellite orbits (satellite-fixed cells), or the cell pattern could be fixed with respect to Earth, with the satellite pointing to the fixed cells as it passes (Earth-fixed cells). For satellite-fixed cells, a terminal must be "handed-off" from cell to cell within and among satellites. Small cells, which lead to high efficiency of resource use, result in a high overhead for frequent hand-offs. With Earth-fixed cells a terminal that remains in the same cell can keep the same channel resources for the duration of the connection. This accommodates the use of small cells by eliminating the hand-off overhead.

Switch Node Modes

Circuit Switched: A dedicated fixed bandwidth connection is established between the two communicating terminals for the duration of the communication. The maximum required bandwidth is allocated for the duration of the connection, even though the actual requirement varies. Advantages are low end-to-end delay, good for real-time speech and data, and efficient for constant rate communication. Does not handle bursty communication efficiently.

Packet Switched: Communication is broken into packets that carry the destination address, sequence data, error detection/correction data, etc. to construct stream at far end. Communication resources are shared among all connections. Packets are passed in store-and-forward mode at switch node with link-by-link error correction by retransmission. This mode is efficient for bursty communication, but introduces high and variable delay, which is unacceptable for speech and real-time data.

Fast Packet Switching: Communication is broken into short fixed-length packets that carry address, sequence and error detection codes. Uses high reliability links to avoid link-by-link error control and low delay nodes to minimize end-to-end delay and variability of delay. Combines advantages of circuit-switched (low delay and high throughput) and packet switched (efficient handling of bursty data). The present invention uses fast packet switching: each satellite node is a fast packet switch that makes independent routing decisions for each packet. Adaptive routing algorithm used to adapt routing decisions to changes in network topology and congestion.

Packet Addressing Modes

Connection-oriented (Virtual Circuit): In this mode the path (set of nodes and links) through the network between terminals is determined at the call origination, and all subsequent packets that are passed over this virtual circuit follow the same path through the network. This works well for a network with fixed topology, but LEO networks are continually changing topology, and virtual circuit would have to be reestablished continuously.

Connectionless (Datagram): In this mode, each packet is routed independently of others that are part of the same connection. Each packet contains the destination address identity, and is routed to destination independently by each node. The present invention uses connectionless operation.

Packet Addressing/Destination Identifier Options

Each packet carries the destination address used by the adaptive routing algorithm to direct the packet from its source through intermediate switch nodes, to the switch node serving the destination terminal (referred to as the Serving Node), and to the terminal itself.

Option 1, (Serving Node, Call ID): In this option the destination address consists of the identity of the satellite currently serving the terminal (Serving Node), and the Call Identity, which is a unique identifier assigned to the call by the current Serving Node. This data is passed to others communicating with this terminal at call origination and each time the address information changes (hand-off to a new satellite, for example). The Call Identifier is assigned to the terminal when it is granted permission to establish a communication channel or when the terminal is handed-off to a new Serving Node (satellite). It is used as an index into a data relation that stores information about the destination terminal, such as supercell, cell, and channel assignment. Intermediate nodes in a connection (that is any node that is not the Serving Node identified in the packet) use only the Serving Node portion of the address to route the packet along the least delay path to that Node. The Serving Node uses the Call Identifier to route the call to the supercell, cell, and channel associated with the terminal.

Option 2, (Supercell, Cell, Channel): In this option the terminal is identified by its current physical location (Supercell, Cell) and by the channel resource identifier (Channel) assigned to it within the Cell. This option is similar to Option 1 with the exception that the address information does not change when the destination terminal is handed-off to another satellite, and intermediate nodes must keep a current mapping of the "Supercell-to-Serving Node" relation, which is easily derived from the Position Determination Algorithm resident in each satellite. The advantage of this Option is that it further simplifies and isolates the effects of the hand-off of a terminal between satellites.

Operation Description

Physical Supercell/Cell Structure: A grid of Supercells and Cells is mapped on the Earth surface. For the present invention, Supercells are squares approximately 160×160 km. Each supercell is composed of 9 equal sized square cells approx 53.3×53.3 km in a 3×3 pattern within each Supercell. Supercells are laid out in contiguous bands parallel to Equator. The number of supercells per band decreases as the cosine of the Latitude of the band (due to decreasing circumference of the band as distance from Equator increases). Within a band the number of the supercell is equal to the integer closest to the band circumference divided by 160 km, and the width is equal to the circumference divided by this number. There is an algorithmic relation between Earth coordinates in angles of Latitude and Longitude and the coordinates of the Supercell (and Cell) expressed in Supercell BAND and the Supercell NUMBER within the band:

If:
Re = Radius of Earth at the Equator (=approx 6,378 km)
Rp = Polar Radius of Earth (=approx 6,357 km)
Ce = Earth Circumference at Equator = 2*Pi*Re
Cp = Polar Circumference of Earth (=2*Pi*Rp)
LAT = Latitude in Degrees
LON = Longitude in Degrees
Clat(LAT) = Circumference of circle parallel to Equator at Lat = Ce*cos(Lat)
Then:
N = Total number of Supercell Bands = Integer((Cp/2)/160)
(LAT, LON) < — > (BAND, NUMBER)
(Supercell coordinates for terminal at (LAT,LON)
BAND = Integer((LAT/90)*(Cp/4)/160)
NUMBER = Integer(((LON/360)*Clat(LAT)/160))

Relation to Multiple Access Method

The Supercell is the present invention's Channel Resource Reuse Zone: that is, the channel resources (frequencies and time slots) can be reused in each Supercell without interfering with adjacent Supercells. The Supercell is divided into 9 cells arranged in a 3×3 pattern. Antenna beams for transmit and receive scan each cell in a fixed time sequence such that Cell N (N=1,2, ... 9,1 ... ) in each Supercell receives transmissions from its serving satellite at the same time. Transmission to the satellite are also timed to insure that all Cell N transmissions are received at the same time. The full complement of frequencies can be used for each cell. Interference is eliminated by use of time division multiplexing among cells in the same supercell (that is only one cell is transmitting/receiving at one time) and space division between active cells in adjacent Supercells.

Relation to Satellite Footprint

The satellite Footprint is determined by the minimum elevation angle to the satellite (mask angle) and the satellite altitude. The preferred embodiment uses a 40 degree mask angle and 700 km altitude resulting in a 706 km radius footprint. A satellite can serve those Supercells with centers within its footprint. The satellite coverage pattern is designed to give a high degree of coverage overlap between satellites, so each satellite has coverage responsibility for less than the entire footprint. In general, a Supercell is the responsibility of the satellite which is closest to the center of the Supercell. When the Supercell center crosses this border, coverage responsibility passes to the next satellite. Since channel resources are associated with the cell rather than the satellite, passing coverage responsibility to the next satellite does not require channel reassignment.

The satellite antenna system is composed of multiple panels of electronically-steered antennas. Each panel is oriented at an angle designed to decrease the steering required to provide coverage to a portion of the satellite footprint. Although each antenna footprint covers only a portion of the satellite footprint, the sum of all antennas provides full coverage with a high degree of overlap. As a satellite passes over a cell, the cell passes through the coverage area of several antenna panels, each of which in turn steers its beam to the cell. When the cell approaches the limit of one antenna's footprint responsibility for serving the cell is passed to another antenna that has a smaller steering angle to the cell. However, since channel resources are associated with the cell rather than the antenna serving the cell, this "hand-off" is completely invisible to the terminals in the cell. An "Antenna-to-Supercell" data relation is maintained in each satellite by the position determination system. This relation is used by the packet routing system to route packets via the fast packet switch to the antenna currently serving the Supercell and Cell of the destination terminal.

Packet Addressing and Routing

Channel Request

Each satellite continually scans the Cells for which it has responsibility to look for terminals requesting service. At the start of each Cell scan time it sends a "Beam-on-Cell" message that identifies the Supercell and Cell being scanned. A terminal wishing to initiate a new connection listens for these messages, compares signal strength if it detects multiple messages, and requests a channel from the cell with the strongest signal. The request, which also contains the terminal's identifier, is sent over a control channel to the serving satellite using a "Slotted ALOHA" protocol. If the System can accept the request it selects an idle channel from those available in this cell and sends a message to the terminal with the identity of the assigned channel. The terminal now has its own complete network address data which includes Cell, Supercell, Channel, and Terminal Identifier.

The originating terminal then sends a call request containing data sufficient to identify the called terminal. By a similar process the called terminal is assigned a channel within its Supercell and Cell. The system provides each terminal with the network address of the other terminal(s) involved in the connection.

Packet Addressing

To send a stream of data to the destination terminal, the originating terminal breaks the stream into a series of fixed length packets, each containing a header and a payload. The header contains the network address of the destination (Supercell, Cell, Channel), packet sequence, Header error control, etc. The terminal transmits to its Serving Node using its assigned channel resources one or more packets (depending on the assigned bandwidth) each Cell scan cycle. The originating terminal's Serving Node receives all transmitted packets from this cell simultaneously, demultiplexes them into separate frequency channels, demodulates and decodes them into packets and passes them to the routing and switching subsystem.

Packet Routing

We define an Intermediate Node as any network node other than the Serving Node for the destination terminal. The job of the Intermediate Node is to select the best "Next Node" on the path to the destination, where the Next Node is connected (via Intersatellite Link) to this node, and is either the Destination Serving Node, or is another Intermediate Node that offers the least delay path to the Destination Serving Node. The job of the Routing/Switching Subsystems at the Destination's Serving Node is to route the packet to the output buffer for the Antenna Subsystem (Supercell) and time slot (Cell) that is currently serving the destination terminal.

The Routing Subsystem extracts the Supercell from the received packet header to use as an index to obtain the Destination Serving Node identity from the "Supercell-to-Serving-Node" Relation. This data relation is maintained by the Autonomous Position Determination System, which keeps track of the location of all satellites in the system. It uses the algorithmic relation between Supercell coordinates and Geographic coordinates to determine which active satellite is closest to each Supercell.

If the Destination Serving Node is This Node, this Relation gives the identity of the Fast Packet Switch output port connected to the Antenna Subsystem currently serving the Supercell. The packet is routed via the Switch to the Antenna Output Buffer Subsystem where it is stored in a buffer associated with the Destination's Cell (identified in the packet header) time slot. It is held in the output buffer until the Cell cycle time, when all packets in the buffer are transmitted in sequence via the Antenna subsystem. The destination terminal extracts the address information from all packets received in its cell cycle time and selects those addressed to the channel(s) assigned to it.

If the Destination Serving Node is not This Node, the Routing Subsystem uses the "Serving-Node-to-Next-Node" Relation to determine whether the Serving Node is connected directly to This Node, or connected to This Node via one or more Intermediate Nodes. This Relation returns the identity of the Fast Packet Switch output port leading to the Intersatellite Link or Gateway Link Subsystem that is connected to the best Next Node. The packet is routed via the Switch to the correct Subsystem where it is held in a queue until it is transmitted.

Compendium of Earth-fixed Cell Features

Substantially eliminates Intrasatellite (Beam-to-Beam) interference and reduces Intersatellite "Handoff" overhead.

Supports use of small cells and small Channel Resource Reuse Zone, which improves spectrum efficiency.

Small cells lead to less power, less biologic effects, high channel density.

Allows "perfect tiling" of cells to completely cover the Earth's surface without overlaps or gaps, which is not possible with satellite-fixed cells, higher efficiency, and avoids frequency conflicts when footprints overlap.

Allows service boundaries to match national or other boundaries. Service offerings, frequencies, etc. can be changed on per cell basis. Not possible with satellite-fixed cells.

Provides a means of sharing load between satellites with overlapping coverage.

Eases determination of which satellite has coverage responsibility for any area or terminal.

Allows terminal addressing by physical address, which simplifies network routing.

Intersatellite handoffs simplified by passing off one Cell or Supercell at a time.

Network provides service to plurality of Terminals within a Service Area.

Service Area divided into an Earth-fixed grid of Cells (Channel Allocation Zones) organized into Channel Resource Reuse Zones (Supercells).

Set of Communication Channel Resources associated with Supercell. System is restricted to this set, but can reuse same set of resources in each Supercell without causing Interference. Resources describe attributes used to distinguish communication signals from each other. (E.g., frequency range of signal, time and/or duration of signal, Spreading Code (used to encode each bit into a code associated with a single Channel), signal polarity, geographical separation between signal sources or destinations, etc.).

Preferred Multiple Access Method describes the rules by which terminals request, access, and share Communication Resource Set among one another.

Subset of total Communication Resource Set associated with each Cell, and terminals within Cell are restricted to this set of resources. Cells and Supercells arranged in a pattern that insures if Cell N of adjacent Supercells use the same set of resources, physical separation eliminates interference.

Method of the preferred embodiment breaks all types of communication into streams of packets, each containing a payload and a header.

The header "destination address" field is used to guide the packet to its destination Supercell, Cell and Terminal.

Network comprises Switching Nodes interconnected by Transmission Links.

Switching nodes capable of decoding each packet header, determining the Serving Node for the destination addressed, and routing this packet directly to the destination terminal or to an intermediate node to which This Node is connected that has the lowest delay path to the terminal.

Switch Nodes reside in Constellation of Low Earth Orbit Satellites.

Satellites are capable of serving all Cells within footprint defined by mask angle and altitude.

Constellation of satellites provides full coverage of Service Area.

Satellites contain Position Determination Subsystem that provides them their position and position of all other sats in Constellation with respect to fixed Cell grid.

Satellites determine their own and other satellite coverage areas using relation between grid and satellite position (for example Serving satellite for Supercell is one closest to center).

Satellites use multiple antennas, each capable of limited range of steering and each covering portion of satellite footprint.

Combination of all antennas provides full coverage of footprint plus overlap.

Satellite keeps data Relations that determine which satellite covers each supercell and for "This Satellite", which antenna subsystem serves each supercell in footprint. This relation is continually changing and updated as satellite passes over cells.

Satellites keep track of assigned and available channel resources for all cells in footprint and allocate resources to requesting Terminals.

CONCLUSION

Although the present invention has been described in detail with reference to a particular preferred embodiment, persons possessing ordinary skill in the art to which this invention pertains will appreciate that various modifications and enhancements may be made without departing from the spirit and scope of the claims that follow. The various orbital parameters and satellite population and configuration statistics that have been disclosed above are intended to educate the reader about one preferred embodiment, and are not intended to constrain the limits of the invention or the scope of the claims. For example, the number of Earth-fixed supercells and cells within the Earth-fixed grid may be varied to suit particular disparate applications without departing substantially form the gist of the invention. Although the specification refers to two particular satellite hardware embodiments, many different satellite designs may be suitable for implementing the present invention. In the claims that follow, the recitation of a "satellite (12)" pertains to a satellite in the generic sense, is not intended to be restricted to any particular design or configuration as long as the satellite can reasonably implement the Earth-fixed cells method. The List of Reference Characters which follows is intended to provide the reader with a convenient means of identifying elements of the invention in the specification and drawings. This list is not intended to delineate or narrow the scope of the claims.

LIST OF REFERENCE CHARACTERS

FIG. 1
10 View of constellation
11 Orbit
12 Satellite
E Earth
FIG. 2
14 View of footprint pattern over United States
16 Footprint
FIGS. 3a and 3b 18 View of one footprint illuminating Earth-Fixed grid
20 Earth-fixed grid
22 Enlarged view of Earth-fixed grid, supercell and cell
24 Supercell
26 Cell
FIG. 4
15 Earth-fixed cell footprint from satellite
28 View of footprint formed by satellite
30 Mask angle
32 Altitude
34 Maximum distance to footprint perimeter from satellite
36 Diameter of footprint
P Portable terminal
M Mobile terminal
F Fixed terminal
G Gateway
FIGS. 5 and 6
38 View of satellite footprints overlaps and gaps at Equator
40 Overlap for 40 satellites/orbit @ 1000 km spacing
42 Overlap for 35 satellites/orbit @ 1142 km spacing
44 Overlap for 30 satellites/orbit @ 1333 km spacing
45 Distance between footprint centers
46 Overlap
48 Gap
50 Potential gap strip
52 Single coverage strip
54 View of satellite footprints overlaps and gaps at 40 degree latitude
56 Double coverage strip
FIG. 7a
13 Simplified antenna elements
19 Earth fixed-cell beam
26t Target cell
58 Sequential views of Satellite providing service to one Earth-fixed cell
FIG. 7b
60 Sequential views of Satellite-Fixed Cell system
61 Satellite using Satellite-Fixed Cell method
62 Satellite fixed-cell beam with no beam steering at low mask angle
64 Satellite fixed cell footprint at high mask angle
66 Low mask angle
FIGS. 7c through 7i
11' Orbit of satellite using satellite-fixed cells
17 Antenna spatial range angle
70 Packet destination node
72 Packet call ID
74 Packet message payload
C1–C5 Cell sequence
pk' Satellite-fixed cell packet
T1, T2 Subscriber terminals
FIGS. 8a and 8b
68 Flowchart showing packet processing
70 Node
72 Call ID
74 Payload
76 Index
78 Cell ID Map
80 Channel assignment
82 Channel entries
84 Cell entries
86 Supercell entries
88 Autonomous Orbit Determination (AOD) Software
90 Position/Output Beam Map
92 Output Beam Map
94 Channel designation
96 Cell designation
98 Output beam designation
100 Fast Packet Switch input
102 Fast Packet Switch
104 Fast Packet Switch output
106 Channel assignment
108 Cell assignment
109 Packet buffer
110 Transmitter
111 Alternative hardware embodiment
FIGS. 9a, 9b and 9c
112 View of cells being scanned
114 Cell scan pattern
116 View of scanning cycle
118 Cell TDM
120 Supercell SDM
122 Scan cycle
124 Transmit/Receive time
126 Guard interval
128 View of Channel Multiplexing
130 Uplink
132 Downlink
134 Channel
136 Time Interval
138 Channel
140 Time interval
142 Bandwidth
Pk Incoming Packet
FIG. 10a
144 Perspective view of Satellite in orbit
146 Satellite
147 Central octagonal panel
148 Antenna panel arms
150 Mast
152 Solar cell and shade
154 Intersatellite link antennas
FIG. 10b
155 Domesat TM
155a Space-facing antennas
155b Earth-facing antennas
155c Solar cells
S Space
FIG. 11
156 View of Satellite from Earth
158 Transmit antennas
160 Receive antennas

What is claimed is:

1. A method for allocating a plurality of beams (19) transmitted from and received at positions in Earth orbit for communicating with a plurality of portable (P), mobile (M) and fixed (F) terminals and gateways (G) comprising the steps of:

forming a plurality of footprints (16) using a plurality of electronically steered, antenna elements (13a, 13b and 13c) which generate said plurality of beams (19);

said plurality of antenna elements (13a, 13b and 13c) being carried onboard a plurality of satellites (12) flying in orbits (11) below geosynchronous altitude;

one of said plurality of satellites (12) including a first serving satellite (12a) and a second satellite (12b) positioned next to said first serving satellite (12a);

said plurality of footprints (16) illuminating portions of an Earth-fixed grid (20) with said plurality of beams (19);

said plurality of beams (19) being capable of conveying a plurality of packets (Pk);

said Earth-fixed grid (20) defining a plurality of Earth-fixed supercells (24);

said plurality of Earth-fixed supercells (24) including a plurality of Earth-fixed cells (26);

said plurality of Earth-fixed cells (26) including a target Earth-fixed cell (26t);

tracking a target Earth-fixed cell (26t) by using a sequence of individual antenna elements (13a, 13b, 13c) aboard said first serving satellite (12a) so that said plurality of beams (19) are maintained over said target Earth-fixed cell (26t) as long as one of said plurality of individual antenna elements (13a, 13b, 13c) aboard said first serving satellite (12a) is capable of serving said target Earth-fixed cell (26t);

measuring the distance from said first serving satellite (12a) which is currently serving said target Earth-fixed cell (26t) to the centroid of said target Earth-fixed cell (26t);

measuring the distance from said second satellite (12b) which is the next closest satellite to said target Earth-fixed cell (26t) compared to said first serving satellite (12a) to the centroid of said target Earth-fixed cell (26t); and switching responsibility for providing said plurality of beams (19) to said target Earth-fixed cell (26t) from said first serving satellite (12a) to said second next satellite (12b) when the distance from said second next satellite (12b) to the centroid of said target Earth-fixed cell (26t) is less than the distance from said first serving satellite (12a) to the centroid of said target Earth-fixed cell (26t).

2. An apparatus for communicating among plurality of portable (P), mobile (M) and fixed (F) terminals and gateways (G) comprising:

a plurality of satellites (12) operating in low Earth orbit;

each of said plurality of satellites (12) having a plurality of electronically steered antennas (13);

said plurality of electronically steered antennas (13) being capable of generating a plurality of beams (19);

said plurality of satellites (12) flying in orbits (11) below geosynchronous altitude;

said plurality of electronically steered antennas (13) being capable of forming a plurality of footprints (16); and an Earth-fixed grid (20) mapped over the surface of the Earth (E);

said plurality of footprints (16) illuminating portions of said Earth-fixed grid (20) with said plurality of beams (19);

said plurality of beams (19) being capable of conveying a plurality of packets (Pk);

said Earth-fixed grid (20) defining a plurality of Earth-fixed supercells (24);

said plurality of Earth-fixed supercells (24) including a plurality of Earth-fixed cells (26);

said Earth-fixed grid (20), said Earth-fixed supercells (24) and said Earth-fixed cells (26) being used to allocate said plurality of beams (19) to provide communications services to said plurality of portable (P), mobile (M) and fixed (F) terminals and gateways (G).

* * * * *

UNITED STATES PATENT AND TRADEMARK OFFICE
CERTIFICATE OF CORRECTION

PATENT NO. : 5,408,237
DATED : April 18, 1995
INVENTOR(S) : Patterson, et al

It is certified that error appears in the above-indentified patent and that said Letters Patent is hereby corrected as shown below:

Column 1, line 33:   "Smart" should be --Stuart--.

Column 1, line 37:   "Smart" should be --Stuart--.

Column 6, line 15:   Before "perspective", insert --a--.

Column 10, line 41:  "3b" should be --3a--.

Column 13, line 36:  After "ATDMA", delete "it".

Column 17, line 66:  "packer's" should be --packet's--.

Column 27, line 54:  "pk' " should be --Pk' --.

Signed and Sealed this

Seventeenth Day of October, 1995

BRUCE LEHMAN

Attest:

Attesting Officer

Commissioner of Patents and Trademarks